(12) United States Patent
Yamazaki et al.

(10) Patent No.: US 11,193,029 B2
(45) Date of Patent: Dec. 7, 2021

(54) INK, INK ACCOMMODATING CONTAINER, RECORDING DEVICE, RECORDING METHOD, AND RECORDED MATTER

(71) Applicant: RICOH COMPANY, LTD., Tokyo (JP)

(72) Inventors: Takuya Yamazaki, Kanagawa (JP); Shigeyuki Harada, Shizuoka (JP); Takuya Saiga, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/804,049

(22) Filed: Feb. 28, 2020

(65) Prior Publication Data

US 2020/0277505 A1    Sep. 3, 2020

(30) Foreign Application Priority Data

Feb. 28, 2019  (JP) .............................. JP2019-036743

(51) Int. Cl.
*C09D 11/107*  (2014.01)
*C09D 11/322*  (2014.01)
(Continued)

(52) U.S. Cl.
CPC .......... *C09D 11/107* (2013.01); *B41J 2/2107* (2013.01); *B41M 5/0023* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 7,771,526 B2 *  8/2010  Yamamoto ........... C09D 11/326
106/31.86
2005/0225617 A1 * 10/2005  Morioka ................ C09D 11/30
347/100
(Continued)

FOREIGN PATENT DOCUMENTS

| JP | 2009-221251 | 10/2009 |
|----|-------------|---------|
| JP | 2009-299005 | 12/2009 |
| JP | 2016-196621 | 11/2016 |

*Primary Examiner* — Manish S Shah
(74) *Attorney, Agent, or Firm* — Grüneberg and Myers PLLC

(57) ABSTRACT

An ink contains water, a coloring material, and a polymer having a structure unit represented by the following Chemical formula 1 and a structure unit having an anionic group, Chemical formula 1 where $R_1$ represents a hydrogen atom or a methyl group, $L_1$ is an alkylene group having three to five carbon atoms having a hydroxyl group, $L_2$ is an alkylene group having two to ten carbon atoms, and Ar represents a phenyl group, a biphenyl group, or a naphthyl group.

9 Claims, 1 Drawing Sheet

(51) Int. Cl.
  *B41M 5/50* (2006.01)
  *C09D 11/033* (2014.01)
  *B41M 5/00* (2006.01)
  *C09D 11/38* (2014.01)
  *B41J 2/21* (2006.01)

(52) U.S. Cl.
  CPC ............ *B41M 5/502* (2013.01); *C09D 11/033* (2013.01); *C09D 11/322* (2013.01); *C09D 11/38* (2013.01)

(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/045; B41J 11/0015; B41J 11/002; B41J 2/04581; B41J 2/055; B41J 2/16538; B41J 2/14201; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 2/04588; B41J 2/04595; B41J 2/04586; B41J 2/14274; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/326; C09D 11/107; C09D 11/03; C09D 11/037; C09D 11/033; C09D 11/101; C09D 11/102; C09D 11/005; C09D 11/54; C09D 11/52; C09D 11/106

See application file for complete search history.

(56) References Cited

U.S. PATENT DOCUMENTS

| | | | |
|---|---|---|---|
| 2007/0032570 A1* | 2/2007 | Sato | C09D 11/326 523/160 |
| 2016/0017075 A1 | 1/2016 | Harada et al. | |
| 2016/0168292 A1 | 6/2016 | Fukuoka et al. | |
| 2016/0222234 A1 | 8/2016 | Matsuyama et al. | |
| 2016/0362572 A1 | 12/2016 | Matsuyama et al. | |
| 2017/0073533 A1 | 3/2017 | Fukuoka et al. | |
| 2017/0121544 A1 | 5/2017 | Koizuka et al. | |
| 2017/0158794 A1 | 6/2017 | Harada et al. | |
| 2017/0174918 A1 | 6/2017 | Yanagawa et al. | |
| 2017/0267884 A1* | 9/2017 | Koizuka | B41J 2/01 |
| 2017/0342286 A1 | 11/2017 | Yanagawa et al. | |
| 2018/0002469 A1 | 1/2018 | Harada et al. | |
| 2018/0002553 A1 | 1/2018 | Harada et al. | |
| 2019/0136076 A1 | 5/2019 | Koizuka et al. | |
| 2019/0264050 A1 | 8/2019 | Harada et al. | |
| 2019/0276694 A1 | 9/2019 | Yamazaki et al. | |

\* cited by examiner

INK, INK ACCOMMODATING CONTAINER, RECORDING DEVICE, RECORDING METHOD, AND RECORDED MATTER

CROSS-REFERENCE TO RELATED APPLICATIONS

This patent application is based on and claims priority pursuant to 35 U.S.C. § 119 to Japanese Patent Application No. 2019-036743, filed on Feb. 28, 2019, in the Japan Patent Office, the entire disclosure of which is hereby incorporated by reference herein.

BACKGROUND

Technical Field

The present disclosure relates to an ink, an ink accommodating container, a recording device, a recording method, and recorded matter.

Description of the Related Art

Aqueous ink using a dye or a pigment is known as ink for use in an inkjet recording method. For such an ink, a component such as a pigment not easily soluble in water needs stably dispersing in water for a long period of time. Therefore, it is effective to use a dispersant in combination.

SUMMARY

According to embodiments of the present disclosure, provided is an ink which contains water, a coloring material, and a polymer having a structure unit represented by the following Chemical formula 1 and a structure unit having an anionic group,

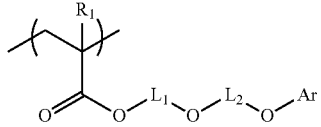

Chemical formula 1 where $R_1$ represents a hydrogen atom or a methyl group, $L_1$ is an alkylene group having there to five carbon atoms having a hydroxyl group, $L_2$ is an alkylene group having two to ten carbon atoms, and Ar represents a phenyl group, a biphenyl group, or a naphthyl group.

As another aspect of embodiments of the present disclosure, provided is recorded matter which includes a recording medium and a printing layer formed on the recording medium, wherein the printing layer contains a coloring material and a polymer having a structure unit represented by the following Chemical formula 1 and a structure unit having an anionic group,

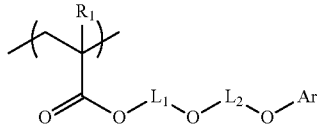

Chemical formula 1 where $R_1$ represents a hydrogen atom or a methyl group, $L_1$ is an alkylene group having three to five carbon atoms having a hydroxyl group, $L_2$ is an alkylene group having two to ten carbon atoms, and Ar represents a phenyl group, a biphenyl group, or a naphthyl group.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
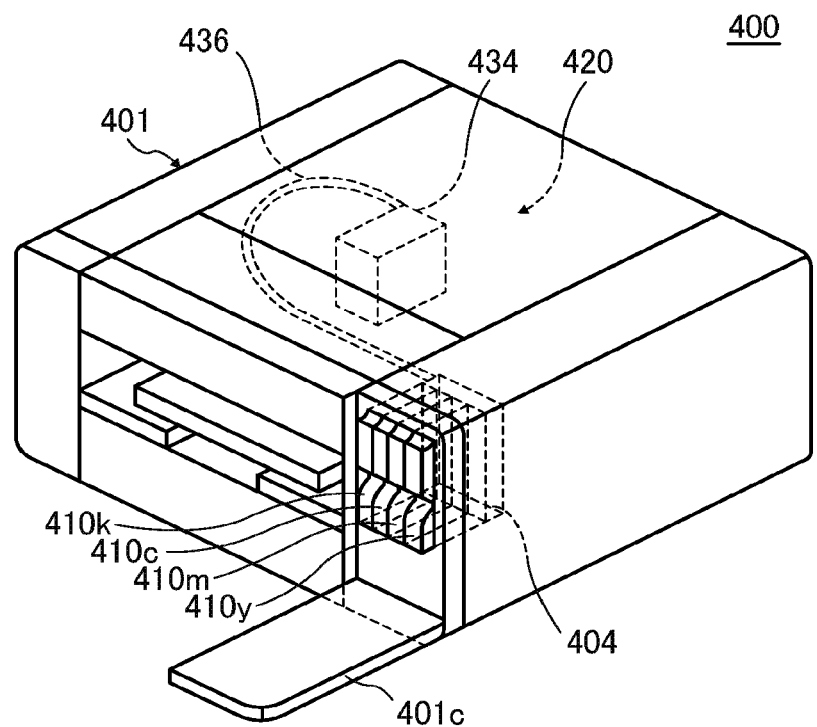
FIG. 1 is a diagram illustrating a perspective view of an example of a recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

A dispersant as a copolymer having a structure unit having an anionic group and a structure unit having a naphthyl group at a terminal has been disclosed in JP-2016-196621-A1 and an ink containing the dispersant can be discharged onto a recording medium by an inkjet method.

However, this has a problem with discharging recovery, which is that when an inkjet head is left not capped by a protection cap that prevents drying of ink and thereafter the ink is supplied to a nozzle, discharging stability is not sufficiently recovered.

The ink of the present disclosure is excellent to recover discharging stability.

Next, an embodiment of the present disclosure is described.

Ink

The ink of the present embodiment contains water, a coloring material, a predetermined polymer, and other optional components such as an organic solvent, a resin other than the predetermined polymer, and a surfactant.

Polymer

The polymer has a structure unit represented by the Chemical formula 1 and further has a structure unit having an anionic group. The polymer may optionally contain other types of structure units in addition to the structure unit represented by the Chemical formula 1 and the structure unit having an anionic group.

The structure unit in the present disclosure indicates the minimum repeating unit (partial structure derived from the monomer) in a polymer formed by bonding polymerizable monomers. In the following description, "polymer" is also referred to as "copolymer".

Structure Unit Represented by Chemical Formula 1

The copolymer has a structure unit represented by the Chemical formula 1.

Chemical formula 1

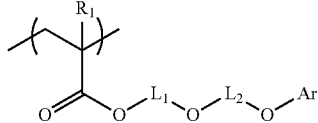

In the structure unit represented by the Chemical formula 1, $R_1$ represents s a hydrogen atom or a methyl group and preferably a methyl group. Also, $L_1$ is a hydroxyl group-containing alkylene group having three to five carbon atoms and is preferably a hydroxyl group-containing alkylene group having three carbon atoms. Also, $L_1$ is preferably an alkylene group having a single hydroxyl groups and three to five carbon atoms and more preferably an alkylene group having a single hydroxyl group and three carbon atoms. $L_2$ is an alkylene group having two to ten carbon atoms and more preferably an alkylene group having two to six carbon atoms. Ar is a phenyl group, a biphenyl group, or a naphthyl group, and is preferably a naphthyl group.

In the structure unit represented by Chemical formula 1, Ar existing at the terminal via alkylene group having an open end (in other words, pendant structure site) has an excellent coloring material adsorption power due to π-π stacking with the coloring material in the ink. In addition, the terminal Ar is preferably a naphthyl group since the π-π stacking with the coloring material in the ink becomes strong as the conjugated system increases.

The structure unit represented by the Chemical formula 1 may typically be the main chain of a copolymer having the terminal Ar drooping via an alkylene group. This does not exclude the case where the side chain partially or entirely includes the structure unit represented by the Chemical formula 1. For example, it is well known that it is difficult to completely exclude secondarily radical polymerization reaction that produces fork structures.

In addition, when a pigment dispersion in which a coloring material such as a pigment is dispersed in water is prepared with a copolymer, the copolymer tends to be adsorbed on the surface of the coloring material due to the presence of Ar at the end of the side chain of the copolymer so that the adsorption power with the coloring material is strong. Therefore, it is possible to obtain a dispersion with a good dispersibility for an extended period of time.

When the number of carbon atoms in $L_1$ and $L_2$ is within the specified range, the hydrophilic site and the hydrophobic site in the copolymer are spaced suitable distances apart so that good dispersion stability is demonstrated when the copolymer is used as a pigment dispersion resin. Also, when the copolymer has an alkylene group with a certain length due to $L_1$ and $L_2$ and a hydroxyl group at the $L_1$ site, which is close to the main chain, the hydrophilicity of the copolymer can be enhanced without impairing the coloring material adsorption ascribable to Ar. As a result, even when the ink dries at a nozzle, the dried matter is easily re-dispersed by the ink supplied to the inside of the nozzle and the discharging recovery of the ink is enhanced.

Specific examples of the structure unit represented by Chemical formula 1 are illustrated below but the present disclosure is not limited thereto.

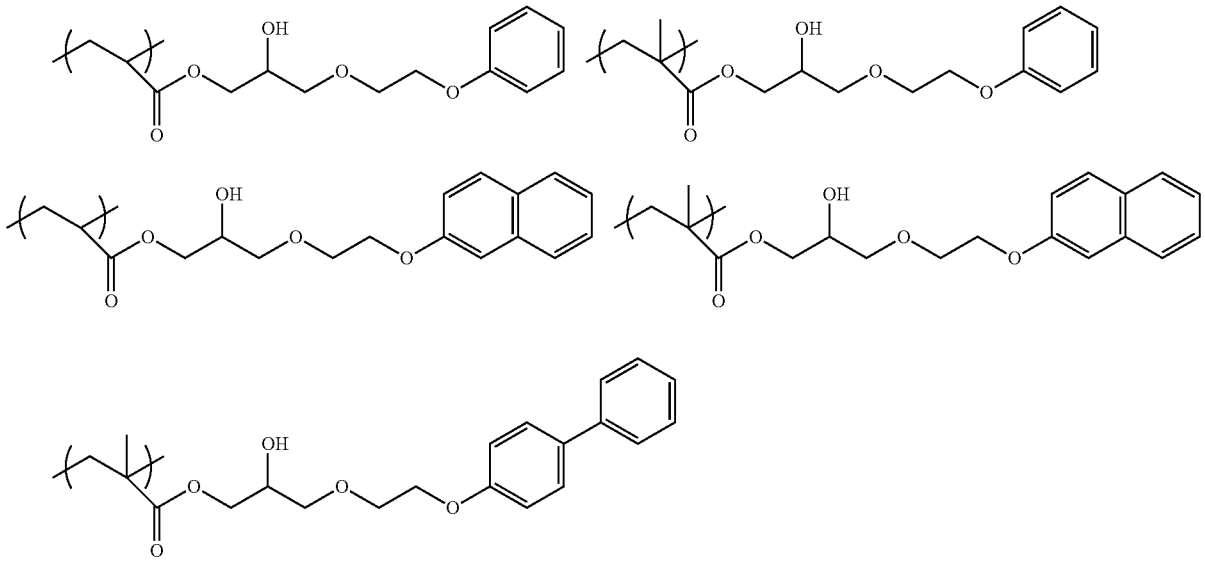

-continued
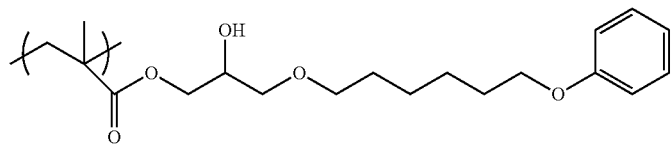
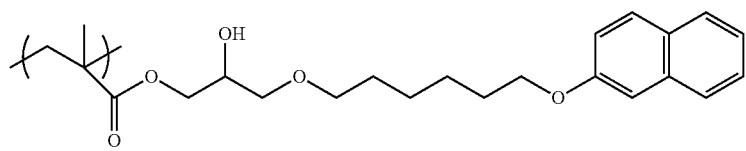
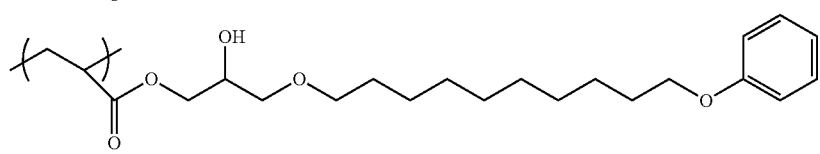
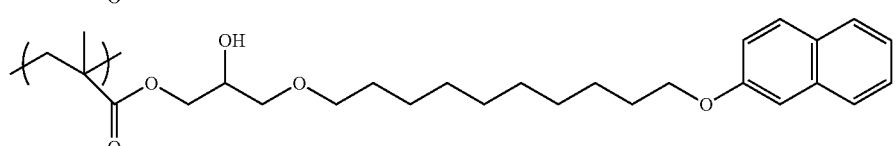
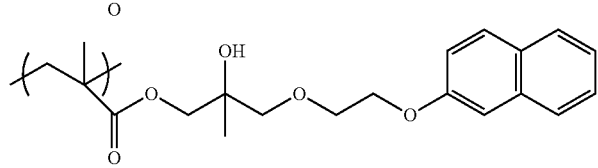
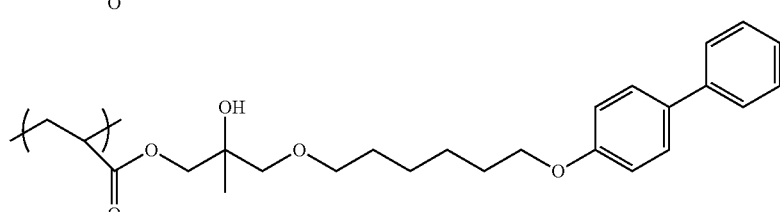
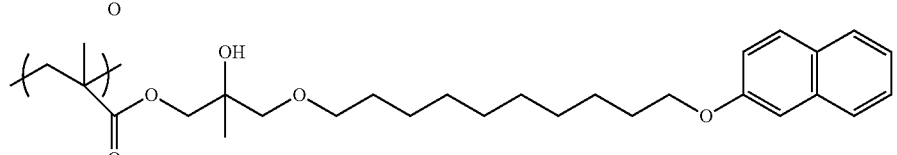
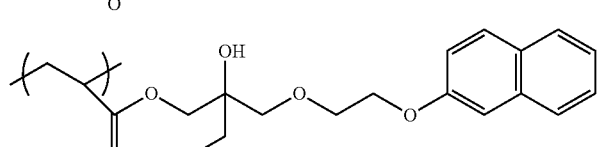
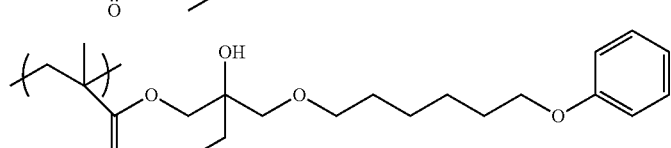
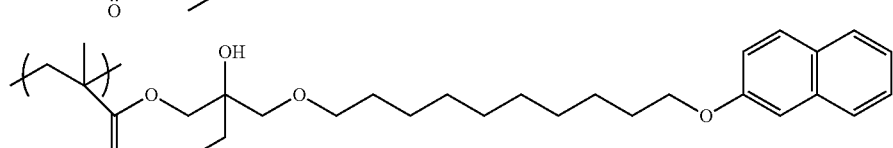
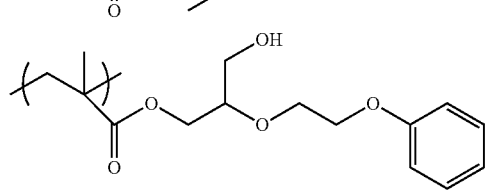

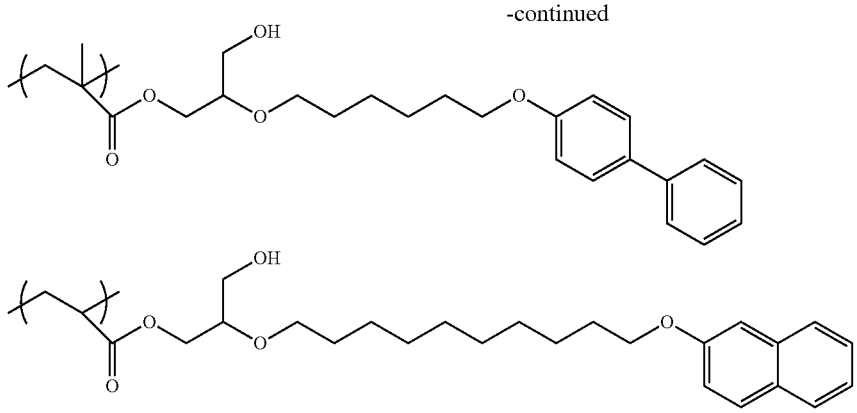

Structure Unit Having Anionic Group

The copolymer has a structure unit having an anionic group. The structure unit having an anionic group is formed by copolymerization of monomers having anionic groups. Examples of the monomer having an anionic group include, but are not limited to, unsaturated carboxylic acid monomers, unsaturated sulfonic acid monomers, and unsaturated phosphoric acid monomers.

Specific examples of the unsaturated carboxylic acid monomers include, but are not limited to, acrylic acid, methacrylic acid, itaconic acid, fumaric acid, and maleic acid.

Specific examples of unsaturated sulfonic acid monomers include, but are not limited to, styrene sulfonic acid, 2-acrylamide-2-methyl propane sulfonic acid.

Specific examples of unsaturated phosphoric acid monomers include, but are not limited to, vinyl phosphoric acid, vinyl phosphate, bis(methcryloxyethyl)phosphate, diphenyl-2-acryloyloxy ethylphosphate, disphenyl-2-methacryloyloxy ethylphosphate, and dibutyl-2-acryloyloxy ethylphosphate. Of these, monomers having carboxylic groups are preferable and acrylic acid and methacrylic acid are more preferable in terms of storage stability.

The monomer having an anionic group can be used alone or in combination.

Specific examples of the structure unit represented as the anionic group 2 are illustrated below but the present disclosure is not limited thereto.

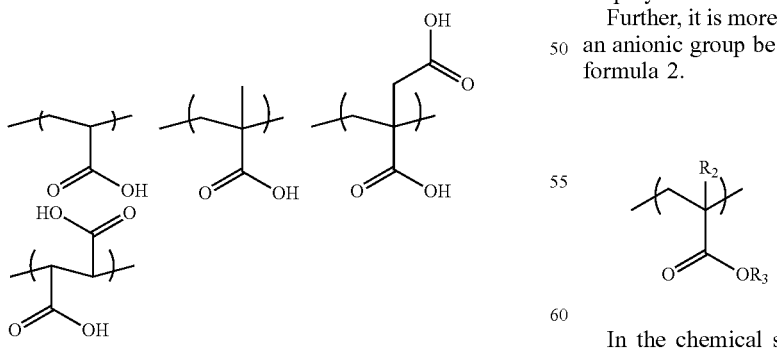

The structure unit having an anionic group may be neutralized by a base.

Specific examples of the base include, but are not limited to, sodium hydroxide, potassium hydroxide, lithium hydroxide, tetramethyl ammonium hydroxide, tetraethyl ammonium hydroxide, tetrapropyl ammonium hydroxide, tetrabutyl ammonium hydroxide, tetrapentyl ammonium hydroxide, tetrahexyl ammonium hydroxide, triethylmethyl ammonium hydroxide, tributylmethyl ammonium hydroxide, trioctylmethyl ammonium hydroxide, 2-hydroxy ethyl trimethyl ammonium hydroxide, tris(2-hydroxyethyl) methyl ammonium hydroxide, propyltrimethyl ammonium hydroxide, hexyltrimethyl ammonium hydroxide, octyltrimethyl ammonium hydroxide, nonyltrimethyl ammonium hydroxide, decyltrimethyl ammonium hydroxide, dodecyltrimerthyl ammonium hydroxide, tetradecyltrimethyl ammonium hydroxide, hexadecyl trimethyl ammonium hydroxide, octadecyl trimethyl ammonium hydroxide, didodecyl dimethyl ammonium hydroxide, ditetradecyl dimethyl ammonium hydroxide, dihexyadecyl dimethyl ammonium hydroxide, dioctadecyl dimethyl ammonium hydroxide, ethylhexadecyl dimethyl amine, ammonium water, dimethyl amine, trimethyl amine, monoethyl amine, diethyl amine, triethyl amine, monoethanol amine, diethanol amine, triethanol amine, methyl ethanol amine, methyldiethanol amine, dimethylethanol amine, monopropanol amine, dipropanol amine, tripropanol amine, isopropanol amine, morpholinine, N-methyl morpholine, N-methyl-2-pyrolidone, and 2-pyrolidone.

These bases serving as neutralizing agents can be used alone or mixed in combination.

The structure unit having an anionic group can be neutralized when the monomer having an anionic group is co-polymerized or when the copolymer is dissolved.

Further, it is more preferable that the structure unit having an anionic group be represented by the following Chemical formula 2.

Chemical formula 2

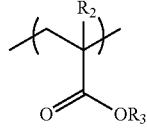

In the chemical structure represented by Chemical formula 2, $R_2$ represents a hydrogen atom or a methyl group. Also, $R_3$ represents a hydrogen atom or a cation.

When $R_3$ is a cation, the oxygen adjacent to the cation is present as $O^-$.

Specific examples of the cation include, but are not limited to, sodium ion, potassium ion, lithium ion, tetramethyl ammonium ion, tetraethyl ammonium ion, tetrapropyl ammonium ion, tetrabutyl ammonium ion, tetrapentyl ammonium ion, tetrahexyl ammonium ion, triethylmethyl ammonium ion, tributylmethyl ammonium ion, trioctylmethyl ammonium ion, 2-hydroxyethyl trimethyl ammonium ion, tris(2-hydroxyethyl)methyl ammonium ion, propyltrimethyl ammonium ion, hexyltrimethyl ammonium ion, octyltrimethyl ammonium ion, nonyltrimethyl ammonium ion, decyltrimethyl ammonium ion, dodecyltrimerthyl ammonium ion, tetradecyltrimethyl ammonium ion, hexadecyl trimethyl ammonium ion, octadecyl trimethyl ammonium ion, didodecyl dimethyl ammonium ion, ditetradecyl dimethyl ammonium ion, dihexyadecyl dimethyl ammonium ion, dioctadecyl dimethyl ammonium ion, ethylhexadecyl dimethyl ammonium ion, ammonium ion, dimethyl ammonium ion, trimethyl ammonium ion, monoethyl ammonium ion, diethyl ammonium ion, triethyl ammonium ion, monoethanol ammonium ion, diethanol ammonium ion, triethanol ammonium ion, methyl ethanol ammonium ion, methyldiethanol ammonium ion, dimethylethanol ammonium ion, monopropanol ammonium ion, dipropanol ammonium ion, tripropanol ammonium ion, isopropanol ammonium ion, morpholinium ion, N-methyl morpholinium ion, N-methyl-2-pyrolidonium ion, and 2-pyrolidonium ion.

Other Structure Unit

The copolymer mentioned above may furthermore optionally include a structure unit derived from other polymerizable monomers in addition to the structure unit represented by the Chemical formula 1 and the structure unit having an anionic group.

Such other polymerizable monomers are not particularly limited. These can be selected to suit to a particular application. Examples thereof are polymerizable hydrophobic monomers, polymerizable hydrophilic monomers, and polymerizable surfactants.

Specific examples of the polymerizable hydrophobic monomers include, but are not limited to, unsaturated ethylene monomers having aromatic ring such as styrene, α-methyl styrene, 4-t-butyl styrene, and 4-chloromethyl styrene; (meth)acrlic acid alkyl such as methyl (meth)acrylate, ethyl(meth)acrylate, n-butyl(meth)acrylate, dimethyl maleate, dimethyl itaconate, dimethyl fumarate, lauryl (meth)acrylate (C12), tridecyl(meth)acrylate (C13), tetradecyl(meth)acrylate (C14), pentadecyl(meth)acrylate (C15), hexadecyl(meth)acrylate (C16), heptadecyl(meth)acrylate (C17), nonadecyl(meth)acrylate (C19), eicosyl (meth)acrylate (C20), heneicosyl(meth)acrylate (C21), and docosyl(meth)acrylate (C22); and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-diemthyl-1-hexene, 4,4-diemthyl-1-hexene, 1-nonene, 3,5,5-trimethyl-1-hexene, 1-decene, 1-undecene, 1-dodecene, 1-tridecene, 1-tetracene, 1-pentadecene, 1-hexadecene, 1-heptadecene, 1-octadecene, 1-nonadecene, 1-eicocene, and 1-dococene. These may be used alone or in combination of two or more thereof.

Specific examples of the polymerizable hydrophilic monomers include, but are not limited to, nonionic unsaturated ethylene monomers such as 2-hydroxyethyl (meth)acrylate, diethylene glycol mono(meth)acrylate, triethylene glycol mono(meth)acrylate, tetraethylene glycol mono (meth)acrylate, polyethylene glycol mono(meth)acrylate, (meth)acrylamide, N-methylol (meth)acrylamide, N-vinylformamide, N-vinylacetamide, N-vinylpyrrolidone, acrylamide, N,N-dimethylacrylamide, N-t-butylacrylamide, N-octylacrylamide, and N-t-octylacrylamide. These may be used alone or in combination of two or more thereof.

The polymerizable surfactant is, for example, an anionic or nonionic surfactant having at least one radically-polymerizable unsaturated double bond group in its molecule.

Examples of the anionic surfactant include, but are not limited to, a hydrocarbon compound having a sulfate group such as ammonium sulfate group ($-SO_3-NH_4^+$) and an allyl group ($-CH_2-CH=CH_2$), a hydrocarbon compound having a sulfate group such as ammonium sulfate group ($-SO_3-NH_4^+$) and a methacylic group [($-CO-C(CH_3)=CH_2$)], and an aromatic hydrocarbon compound having a sulfate group such as ammonium sulfate group ($-SO_3-NH_4^+$) and a 1-propenyl group ($-CH=CH_2CH_3$). The anionic surfactant is available on the market.

Specific examples include, but are not limited to, ELEMINOL JS-20 and RS-300 (both manufactured by Sanyo Chemical Industries, Ltd.) and Aqualon KH-10, Aqualon KH-1025, Aqualon KH-05, Aqualon HS-10, Aqualon HS-1025, Aqualon BC-0515, Aqualon BC-10, Aqualon BC-1025, Aqualon BC-20, and Aqualon BC-2020 (all manufactured by DKS Co. Ltd.).

The nonionic surfactant is, for example, a hydrocarbon compound or an aromatic hydrocarbon compound having 1-propenyl group ($-CH=CH_2CH_3$) and a polyoxyethylene group [$-(C_2H_4O)_n-H$]. Specific examples of the product of the nonionic surfactant available on the market include, but are not limited to, Aqualon RN-20, Aqualon RN-2025, Aqualon RN-30, and Aqualon RN-50 (all manufactured by DKS Co. Ltd.) and LATEMUL PD-104, LATEMUL PD-420, LATEMUL PD-430, and LATEMUL PD-450 (all manufactured by Kao Corporation).

Compositional Ratio of Each Structure Unit

The proportion of the structure unit represented by the Chemical formula 1 is not particularly limited and can be suitably determined to suit to a particular application. The proportion is preferably from 60 to 90 percent by mass and more preferably from 75 to 90 percent by mass to the total amount of the copolymer. If discharging stability of an inkjet head is recovered by supplying ink to the inkjet head placed in a state where the protection cap for reducing drying of the ink on the nozzle surface of the inkjet head does not cap the inkjet head (hereinafter, also referred to as a "decapped state"), discharging recovery property can be more enhanced when the proportion is within this range.

The proportion of the structure unit having an anionic group is not particularly limited and can be suitably selected to suit to a particular application. It is preferably from 10 to 40 percent by mass based on the total content of the copolymer. If discharging stability of an inkjet head is recovered by supplying ink to the inkjet head placed in a decapped state, discharging recovery property can be more enhanced when the proportion is within this range.

The proportion of the other structure units derived from the polymerizable hydrophobic monomer or the polymerizable hydrophilic monomer is not particularly limited and can be suitably selected to suit to a particular application. The proportion is preferably from 5 to 100 percent by mass based on the total content of the structure unit represented by the Chemical formula 1 illustrated above and the structure unit having an anionic group.

The proportion of the other structure units derived from the polymerizable surfactant is not particularly limited and can be suitably selected to suit to a particular application. The proportion is preferably from 0.1 to 10 percent by mass to the total content of the structure unit represented by the Chemical formula 1 and the structure unit having an anionic group.

Molecular Weight of Polymer

The weight average molecular weight of the copolymer is preferably from 10,000 to 50,000 in polystyrene conversion. More preferably, it is from 15,000 to 40,000. If discharging stability of an inkjet head is recovered by supplying ink to the inkjet head placed in a decapped state, discharging recovery property can be more enhanced when the weight average molecular weight is within this range.

Method of Synthesizing Polymer

The copolymer can be obtained by co-polymerizing the monomer represented by the Chemical formula 3 and the monomer having an anionic group under the presence of a radical polymerization initiator.

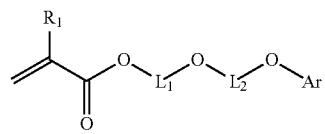

Chemical formula 3

In Chemical formula 3, $R_1$ represents a hydrogen atom or a methyl group. $L_1$ is a hydroxyl group-containing alkylene group having three to five carbon atoms and is preferably an alkylene group having three to five carbon atoms and a single hydroxyl group. $L_2$ is an alkylene group having two to ten carbon atoms. Ar is a phenyl group, a biphenyl group, or a naphthyl group, and is preferably a naphthyl group.

Specific examples of the monomer represented by the Chemical formula 3 are illustrated below but are not limited thereto.

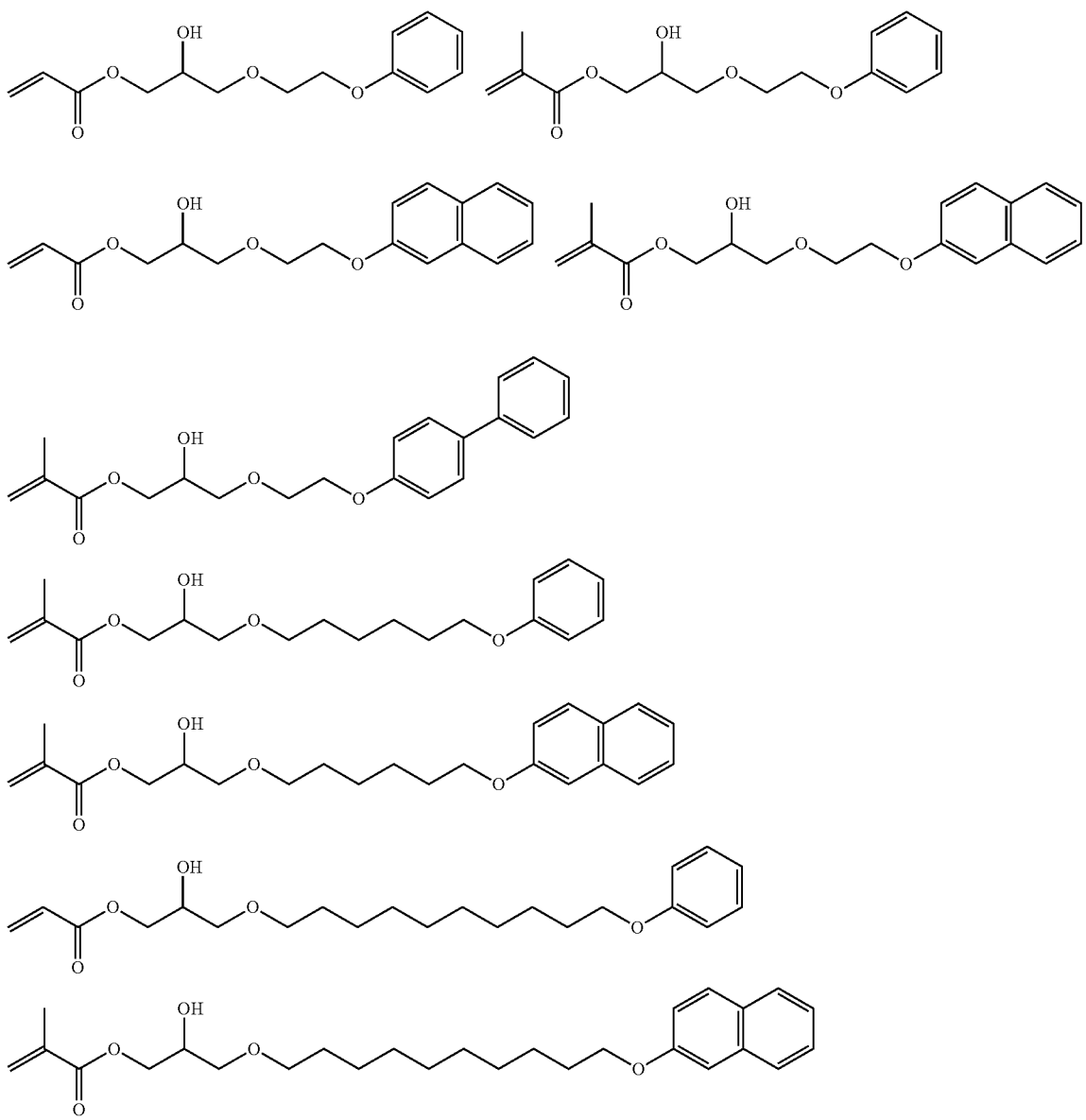

-continued

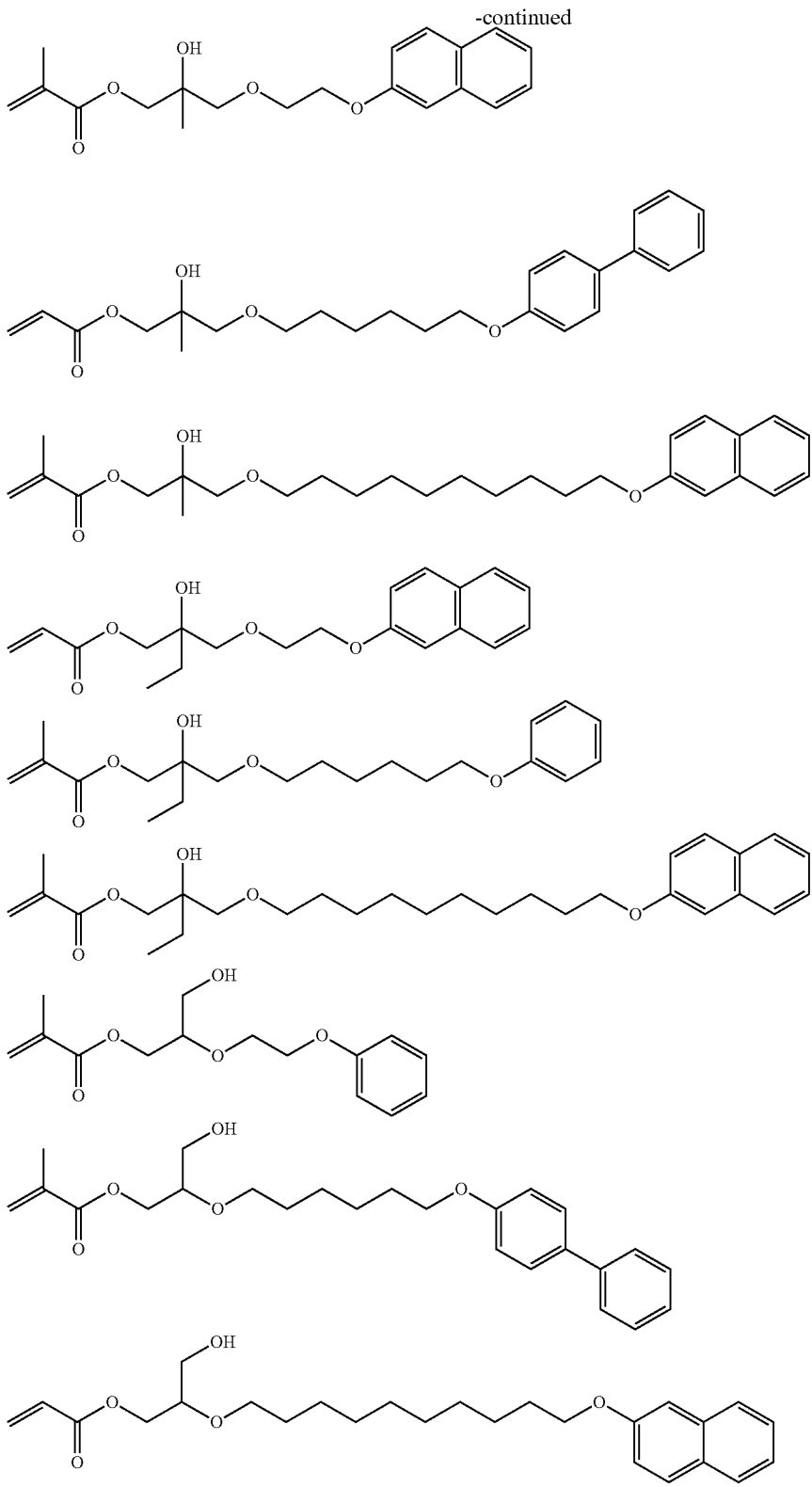

The monomer represented by the Chemical formula 3 can be synthesized for use according to the following reaction formula 1 but is not limited to the following synthesis examples. That is, as illustrated in the following reaction formula 1, it is possible to obtain a monomer represented by the Chemical formula 3 by ring-opening reaction of a (meth)acrylate monomer (R-1) having an epoxide terminal with an alcohol (R-2) having an aromatic terminal under the presence of a base catalyst such as tetrabutyl ammonium bromide.

Reaction formula 1

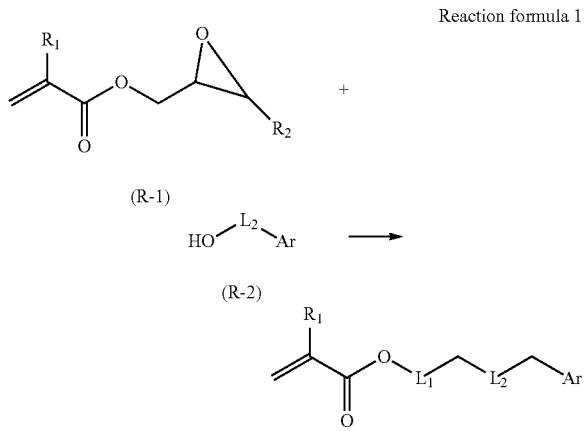

In the reaction formula 1, $R_1$ represents a hydrogen atom or a methyl group. $R_2$ represents a methyl group or an ethyl group. $L_1$ is a hydroxyl group-containing alkylene group having three to five carbon atoms and is preferably an alkylene group having three to five carbon atoms and a single hydroxyl group. $L_2$ is an alkylene group having two to ten carbon atoms. Ar is a phenyl group, a biphenyl group, or a naphthyl group, and is preferably a naphthyl group.

For (R-1) in the reaction formula 1, a commercially available reagent can be used. It is also possible to use after the synthesis as in the following reaction formula 2 but the monomer is not limited to the following synthesis examples. That is, it is possible to obtain (R-1) by reacting the (meth)acrylate monomer (R-3) with an epoxide (R-4) having an excessive amount of an alkyl halide chain under the presence of a base catalyst such as benzyl triethyl ammonium chloride.

Reaction formula 2

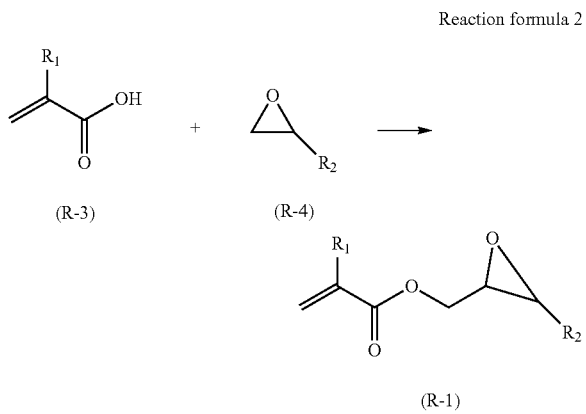

In the reaction formula 2, $R_1$ represents a hydrogen atom or a methyl group. $R_2$ represents hydrogen atom, a methyl group, or an ethyl group.

For (R-2) in the reaction formula 1, a commercially available reagent can be used. It is possible to use after the synthesis as in the following reaction formula 3 but the monomer is not limited to the following synthesis examples. That is, (R-2) can be obtained by reacting an aromatic compound (R-4) having a terminal alcohol with an excessive amount of an alkyl halide (R-5) under the presence of an excessive amount of a base such as potassium carbonate.

Reaction formula 3

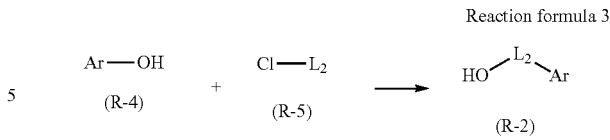

In the reaction formula 3, $L_2$ represents an alkylene group having two to ten carbon atoms. Ar is a phenyl group, a biphenyl group, or a naphthyl group, and is preferably a naphthyl group.

To synthesize the copolymer mentioned above, it is preferable to use the method using a radical polymerization initiator and more preferable to use the solution polymerization method conducting polymerization reaction in a solution in terms of easiness of polymerization operation and molecular weight control.

Specific examples of the solvent preferably usable for radical polymerization in the solution polymerization method include, but are not limited to, ketone-based solvents such as acetone, methylethyl ketone, and methyl isobutyl ketone, acetic acid ester-based solvents such as ethyl acetate and butyl acetate, aromatic hydrocarbon-based solvents such as benzene, toluene, and xylene, isopropanol, ethanol, cyclohexane, tetrahydrofuran, dimethylformamide, dimethylsulfoxide, and hexamethyl phosphoamide are suitable. Of these, the ketone-based solvents, the acetic acid ester-based solvents, and alcohol-based solvents are preferable.

The radical polymerization initiator is not particularly limited and can be suitably selected to suit to a particular application.

Specific examples include, but are not limited to, peroxyketal, hydroperoxide, dialkyl peroxide, diacyl peroxide, peroxydicarbonate, peroxyester, cyano-based azobisisobutyronitrile, azobis (2-methylbutyronitrile), azobis (2,2'-isovaleronitrile), and non-cyano-based dimethyl-2,2'-azobisisobutyrate. Of these, in terms of easiness of molecular weight control and low decomposition temperature, organic peroxides and azo-based compounds are preferable and azo-based compounds are particularly preferable.

In addition, there is no specific limit to the content of the radical polymerization initiator and the proportion can be determined to suit to a particular application. The proportion is preferably from 1 to 10 percent by mass based on the total amount of the polymerizable monomer.

Proportion of Polymer

The proportion of the copolymer in the ink is not particularly limited and can be suitably selected to suit to a particular application. For example, it is preferably from 0.05 to 10 percent by mass and more preferably from 0.1 to 10 percent by mass. When the proportion is not less than 0.05 percent by mass, dispersibility and storage property are improved. When the proportion is not greater than 10 percent by mass, it is possible for an ink to have a suitable range of viscosity when the ink is discharged from a head.

Application of Polymer

The application of the copolymer is not particularly limited and can be used as a dispersant for a pigment and an additive for a pigment dispersion. Usage of the copolymer as a dispersant for a pigment further improves storage stability of ink containing even a large amount of a water-soluble organic solvent.

The amount of the copolymer is not particularly limited and can be suitably selected to suit to a particular application when used as a pigment dispersant. The mass ratio of the copolymer to the pigment is preferably from 0.01 to 1 and more preferably from 0.05 to 0.8. With the mass ratio within this range, it is advantageous that image density becomes high and storage stability can be better.

Water

As the water, pure water and hyper pure water such as deionized water, ultrafiltered water, reverse osmosis water, and distilled water can be used.

The proportion of water in the ink is not particularly limited and can be suitably selected to suit to a particular application. In terms of drying property and discharging reliability of the ink, the proportion is preferably from 10 to 90 percent by mass and more preferably from 20 to 60 percent by mass to the total amount of the ink.

Coloring Material

Pigments and dyes can be used as the coloring material. With regard to the adsorption power of the copolymer to the coloring material, pigments are superior to dyes. Moreover, pigments are preferable in terms of water resistance and light resistance.

The pigment is not particularly limited and suitably selected to suit to a particular application. For example, inorganic pigments or organic pigments for black or color are suitably selected. These can be used alone or in combination.

As the inorganic pigments, for example, it is possible to use carbon black manufactured by known methods such as contact methods, furnace methods, and thermal methods in addition to titanium oxide, iron oxide, calcium oxide, barium sulfate, aluminum hydroxide, barium yellow, cadmium red, and chrome yellow.

Specific examples of the pigments for black include, but are not limited to, carbon black (C.I. Pigment Black 7) such as furnace black, lamp black, acetylene black, and channel black, metals such as copper and iron (C.I. Pigment Black 11), and metal oxides such as titanium oxides, and organic pigments such as aniline black (C.I. Pigment Black 1).

It is suitable to use carbon black which is manufactured by a furnace method or channel method and has a primary particle diameter of from 15 to 40 nm, a specific surface area of from 50 to 300 $m^2/g$ according to Brunauer-Emmett-Teller (BET) method, a dibutylphthalate (DPB) absorption oil amount of from 40 to 150 ml/100 g, a volatile content of from 0.5 to 10 percent, and pH of from 2 to 9.

Specific examples of the organic pigments include, but are not limited to, azo pigments (azo lakes, insoluble azo pigments, azo pigment condensates, chelate azo pigments, etc.), polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelate, acid dye type chelate), nitro pigments, nitroso pigments, and aniline black. Of these pigments, in particular pigments having good affinity with water are preferably used.

Specific examples of the azo pigments include, but are not limited to, azo lake, insoluble azo pigments, azo pigment condensates, and chelate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, quinofuranone pigments, and Rhodamine B lake pigments.

Specific examples of the dye chelate include, but are not limited to, basic dye type chelates and acid dye type chelates.

The pigment for yellow is not particularly limited and can be suitably selected to suit to a particular application.

Specific examples include, but are not limited to, CI Pigment Yellow 1, CI Pigment Yellow 2, CI Pigment Yellow 3, and C.I. CI Pigment Yellow 12, CI Pigment Yellow 13, CI Pigment Yellow 14, CI Pigment Yellow 16, CI Pigment Yellow 17, CI Pigment Yellow 73, CI Pigment Yellow 74, CI Pigment Yellow 75, CI Pigment Yellow 83, CI Pigment Yellow 93, CI Pigment Yellow 95, CI Pigment Yellow 97, CI Pigment Yellow 98, CI Pigment Yellow 114, CI Pigment Yellow 120, CI Pigment Yellow 128, CI Pigment Yellow 129, CI Pigment Yellow 138, CI Pigment Yellow 150, CI Pigment Yellow 151, CI Pigment Yellow 154, CI Pigment Yellow 155, CI Pigment Yellow 174, and CI Pigment Yellow 180.

The pigment for magenta is not particularly limited and can be suitably selected to suit to a particular application. Specific examples include, but are not limited to, C.I.Pigment Red 5, C.I.Pigment Red 7, C.I.Pigment Red 12, C.I.Pigment Red 48 (Ca), C.I.Pigment Red 48 (Mn), C.I.Pigment Red 57 (Ca), C.I.Pigment Red 57:1, C.I.Pigment Red 112, C.I.Pigment Red 122, C.I.Pigment Red 123, C.I.Pigment Red 146, C.I.Pigment Red 168, C.I.Pigment Red 176, C.I.Pigment Red 184, C.I.Pigment Red 185, C.I.Pigment Red 202, and C.I.Pigment Violet 19.

The pigment for cyan is not particularly limited and can be suitably selected to suit to a particular application. Specific examples include, but are not limited to, C.I.Pigment Blue 1, C.I.Pigment Blue 2, C.I.Pigment Blue 3, C.I.Pigment Blue 15, C.I.Pigment Blue 15:3, C.I.Pigment Blue 15:4, C.I.Pigment Blue 15:34, C.I.Pigment Blue 16, C.I.Pigment Blue 22, C.I.Pigment Blue 60, C.I.Pigment Blue 63, C.I.Pigment Blue 66, C.I.Pat Blue 4, and C.I.Pat Blue 60.

By using C.I.Pigment Yellow 74 as yellow pigment, C.I.Pigment Red 122, and C.I.Pigment Violet 19 as magenta pigment, and C.I.Pigment Blue 15:3 as cyan pigment, a well-balanced ink having excellent color tone and light resistance is obtained.

In addition, in terms of coloring of obtained images, it is suitable to use a self-dispersible pigment and preferable to use an anionic self-dispersible pigment. The anionic self-dispersible pigment is formed by introducing an anionic functional group to the surface of a pigment directly or via another atom group to stabilize dispersion. In the anionic functional group, more than a half of hydrogen ions are dissociated at pH 7.0.

Specific examples of the anionic functional groups include, but are not limited to, a carboxyl group, a sulfo group, and a phosphonic acid group. Of these, to improve the optical density of obtained images, a carboxyl group or a phosphonic acid group is preferable. An anionic functional group is introduced into the surface of a pigment by, for example, oxidation treatment of carbon black.

Specific examples of the oxidation treatment method include a treatment method using hypochlorite, ozone water, hydrogen peroxide, chlorite, nitric acid, etc., and a surface treatment method using a diazonium salt. In addition, specific examples of the commercially available pigment having a surface into which a hydrophilic group is introduced include, but are not limited to, CW-1, CW-2, and CW-3 (all manufactured by Orient Chemical Industries Co., Ltd.), and CAB-O-JET200, CAB-O-JET300, and CAB-O-JET400 (all manufactured by Cabot Corporation).

The proportion of the pigment in the ink is not particularly limited and can be suitably selected to suit to a particular application. For example, it is preferably from 0.5 to 20 percent by mass and more preferably from 1 to 10 percent by mass to the total amount of the ink.

As the dye, dyes classified into acidic dyes, direct dyes, basic dyes, reactive dyes, and food dyes in the color index can be used.

Specific examples of acidic dyes and food dyes include, but are not limited to, C.I. Acid Black 1, 2, 7, 24, 26, and 94, C.I. Acid Yellow 17, 23, 42, 44, 79, and 142, C.I. Acid Blue 9, 29, 45, 92, and 249, C.I. Acid Red 1, 8, 13, 14, 18, 26, 27, 35, 37, 42, 52, 82, 87, 89, 92, 97, 106, 111, 114, 115, 134. 186, 249, 254, and 289, C. I. Food Black 1 and 2, C. I. Food Yellow 3 and 4, and C. I. Food Red 7, 9, and 14.

Specific examples of direct dyes include, but are not limited to, C.I. Direct Black 19, 22, 32, 38, 51, 56, 71, 74, 75, 77, 154, (168), and 171, C.I. Direct Yellow 1, 12, 24, 26, 33, 44, 50, 86, 120, 132, 142, and 144, C.I. Direct Blue 1, 2, 6, 15, 22, 25, 71, 76, 79, 86, 87, 90, 98, 163, 165, 199, and 202, C.I. Direct Red 1, 4, 9, 13, 17, 20, 28, 31, 39, 80, 81, 83, 89, 225, and 227, and C.I. Direct Orange 26, 29, 62, and 102.

Specific examples of basic dyes include, but are not limited to, C.I. Basic Black 2 and 8, C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91, C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155, and C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112.

Specific examples of reactive dyes include, but are not limited to, C. I. Reactive Black 3, 4, 7, 11, 12, and 17; C. I. Reactive Yellow 1, 5, 11, 13, 14, 20, 21, 22, 25, 40, 47, 51, 55, 65, and 67; C.I. Reactive Blue 1, 2, 7, 14, 15, 23, 32, 35, 38, 41, 63, 80, and 95; C.I. Reactive Red 1, 14, 17, 25, 26, 32, 37, 44, 46, 55, 60, 66, 74, 79, 96, and 97.

Organic Solvent

There is no specific limitation to the organic solvent. For example, water-soluble organic solvents can be used. Examples include, but are not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples of the water-soluble organic solvent include, but are not limited to: polyhydric alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethyl ether; and polyol arylethers such as ethyleneglycol monophenylether and ethyleneglycol monobenzylether.

The polyhydric alcohol compounds having eight or more carbon atoms and glycolether compounds enhance permeability of ink for paper used as a recording medium.

The proportion of the organic solvent in the ink has no particular limit and can be suitably selected to suit to a particular application.

In terms of drying property and discharging reliability of the ink, the proportion is preferably from 10 to 60 percent by mass and more preferably from 20 to 60 percent by mass.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, silicone-based surfactants not decomposed even in high pH environment are preferable. Examples of the silicone-based surfactant include, but are not limited to, side-chain modified polydimethylsiloxane, both-terminal modified polydimethylsiloxane, one terminal-modified polydimethyl siloxane, and side chain both terminal modified polydimethylsiloxane. As the modification group, it is particularly preferable to select a polyoxyethylene group or polyoxyethylene polyoxypropylene group because these demonstrate good properties as aqueous surfactants. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, perfluoroalkyl sulfonic acid and salts of perfluoroalkyl sulfonic acid. Specific examples of the perfluoroalkyl carbonic acid compounds include, but are not limited to, perfluoroalkyl carbonic acid and salts of perfluoroalkyl carbonic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, $L_1$, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethyl siloxane, one-distal-end-modified polydimethyl siloxane, and side-chain-both-distal-end-modified polydimethyl siloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

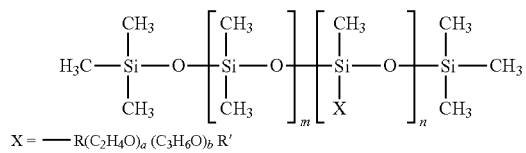

$X = —R(C_2H_4O)_a(C_3H_6O)_b R'$

In Chemical formula S-1, "m", "n", "a", and "b" each, respectively independently represent integers, R represents an alkylene group, and R' represents an alkyl group.

Specific examples of the polyether-modified silicone-based surfactant include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

The fluorochemical surfactant is preferably a compound having 2 to 16 fluorine-substituted carbon atoms and more preferably a compound having 4 to 16 fluorine-substituted carbon atoms.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not easily foam and the fluorosurfactant represented by the following Chemical formula F-1 or Chemical formula F-2 is preferable.

Chemical formula F-1

In the compound represented by Chemical formula F-1, m is preferably 0 or an integer of from 1 to 10 and n is preferably 0 or an integer of from 1 to 40.

Chemical formula F-2

In the compound represented by the chemical formula F-2, Y represents H or $C_mF_{2m+1}$, where m represents an integer of from 1 to 6, or $CH_2CH(OH)CH_2—C_mF_{2m+1}$, where m represents an integer of from 4 to 6, or $C_pH_{2p+1}$, where p is an integer of from 1 to 19. n represents an integer of from 1 to 6. a represents an integer of from 4 to 14.

As the fluorochemical surfactant, products available on the market may be used. Specific examples include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the ink is not particularly limited and can be suitably selected to suit to a particular application. For example, the proportion is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation.

Specific examples include, but are not limited to, acid sulfites and sodium thiosulfates.

pH Regulator

The pH regulator has no particular limit as long as it can control pH to be not lower than 7.

Specific examples include, but are not limited to, amines such as diethanol amine and triethanol amine.

Property of Ink

Properties of the ink are not particularly limited and can be suitably selected to suit to a particular application. For example, viscosity, surface tension, and pH are preferably in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1° 34'× R24)
Sample liquid amount: 1.2 mL
Rotational frequency: 50 rotations per minute (rpm)
25 degrees C.
Measuring time: three minutes.

The surface tension of the ink is preferably 35 mN/m or less and more preferably 32 mN/m or less at 25 degrees C. in terms that the ink is suitably leveled on a recording medium and the drying time of the ink is shortened.

pH of the ink is preferably from 7 to 12 and more preferably from 8 to 11 in terms of prevention of corrosion of metal material in contact with liquid.

Method of Manufacturing Ink

An example of the method of manufacturing an ink includes dispersing or dissolving water, a coloring material, a polymer, and other components in an aqueous medium followed by stirring and mixing. The copolymer may be used as a coloring material-dispersing resin to prepare a coloring material dispersion.

The materials can be dispersed by, for example, a sand mill, a homogenizer, a ball mill, a paint shaker, an ultrasonic dispersing machine, etc. Typically, a stirrer using a stirring blade, a magnetic stirrer, a high performance disperser, etc., can be used for the mixing and stirring.

Recording Medium

The recording medium to which an ink is applied is not particularly limited.

Specific examples include, but are not limited to, plain paper, gloss paper, special paper, cloth, film, transparent sheets, and printing paper for general purposes.

Recorded Matter

The recorded matter has a recording medium and a printing layer formed with the ink of the present embodiment on the recording medium. The printing layer is formed by applying and drying the ink of the present embodiment so that it contains the above-described coloring material and polymer.

Ink Accommodating Container

The ink accommodating container includes an ink accommodating unit to contain the ink of the present embodiment and other optional suitably-selected members.

There is no specific limit to the ink accommodating container. Any form, any structure, any size, and any material can be suitably selected to a particular application. For example, it is suitable to use a container having a unit formed of aluminum laminate film, a resin film, etc., or an ink tank that can contain a large amount of ink.

Recording Device and Recording Method

The ink of the present embodiment can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

The recording device and the recording method respectively represent a device capable of discharging ink, various processing fluids, etc. to a recording medium and a method of conducting recording on the recording medium utilizing the device. The recording medium means an article to which ink or various processing fluids can be temporarily or permanently attached.

The recording device may further optionally include a device relating to feeding, conveying, and ejecting a recording medium and other devices referred to as a pre-processing device, a post-processing device, etc., in addition to the head portion to discharge (or apply) the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll form as a recording medium.

Figure 2:
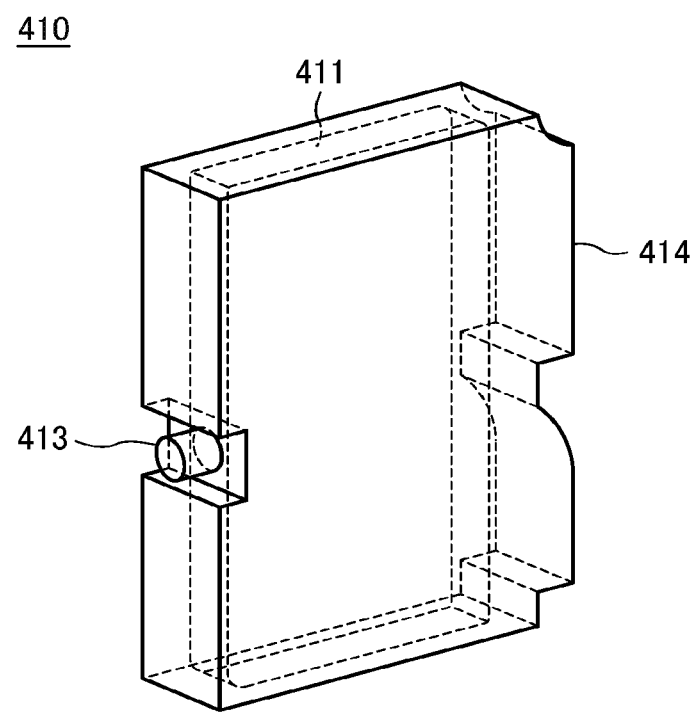
FIG. 2 is a diagram illustrating a perspective view of an example of a tank.

The recording device is described using an example with reference to FIG. 1 and FIG. 2.

FIG. 1 is a diagram illustrating a perspective view of the recording device. FIG. 2 is a diagram illustrating a perspective view of the main tank. An image forming device 400 as an embodiment of the recording device is a serial type image forming device. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of, for example, packaging material such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401c is opened. The main tank 410 is detachably attached to the cartridge holder 404. This enables each ink outlet 413 of the main tank 410 to communicate with a discharging head 434 for each color via a supplying tube 436 for each color so as to discharge the ink from the discharging head 434 to a recording medium.

How to use the ink is not limited to the inkjet recording method. Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

Field of Application

The usage of the ink of the present embodiment is not particularly limited and can be suitably selected to suit to a particular application. For example, the ink can be used for printed matter, a paint, a coating material, and foundation. The ink can be used to form two-dimensional texts and images and furthermore a three-dimensional solid object (solid freeform fabrication object) as a material for 3D modeling.

The solid fabrication apparatus to fabricate a solid fabrication object can be any known device with no particular limit. For example, the apparatus includes a container, a supplying device, and a discharging device, a drier, etc., of ink. The solid fabrication object includes an object manufactured by repeated ink coating. In addition, the solid fabrication object includes a mold-processed product manufactured by processing a structure having a substrate such as a recording medium to which the ink is applied. The mold-processed product is manufactured from recorded matter or a structure having a sheet-like form, film-like form, etc., by, for example, heating drawing or punching. The mold-processed product is suitably used for articles which are molded after surface-decorating. Examples are gauges or operation panels of vehicles, office machines, electric and electronic devices, cameras, etc.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto. Part and percent respectively represent parts by mass and percent by mass, unless otherwise specified.

The average molecular weight of the copolymers used in Examples and Comparative Examples was obtained as follows:

Measuring of Average Molecular Weight of Copolymer

The average molecular weight of the copolymer was measured by gel permeation chromatography (GPC) under the following conditions:

Instrument: GPC-8020 (manufactured by TOSOH CORPORATION)
Column: TSK G2000 HXL and G4000 HXL (manufactured by TOSOH CORPORATION)
Temperature: 40 degrees C.
Solvent: Tetrahydrofuran (THF)
Flow rate: 1.0 mL/min.

A total of 1 mL of a copolymer having a concentration of 0.5 percent by mass was infused into the column. Based on the molecular weight calibration curve obtained based on a simple dispersion polystyrene standard sample from the molecular weight distribution of the copolymer measured under the conditions specified above, the number average molecular weight Mn and the weight average molecular weight Mw of the copolymer were calculated.

Synthesis Example 1: Synthesis of Copolymer CP-1

A total of 23.5 g (250 mmol) of phenol was dissolved in 800 ml of N,N-dimethyl formamide (manufactured by TOKYO CHEMICAL INDUSTRY CO., LTD.), 138.0 g (1,000 mmol) of potassium carbonate (manufactured by TOKYO CHEMICAL INDUSTRY CO., LTD.) was added followed by stirring, 60.3 g (749 mmol) of 2-chloroethanol (manufactured by Sigma-Aldrich Co. LLC.) was added dropwise. The resulting mixture was stirred at 80 degrees C. Three hours later, 30.1 g (374 mmol) of 2-chloroethanol and 69.0 g (500 mmol) of potassium carbonate were added. Another three hours later, 30.1 g (374 mmol) of 2-chloroethanol and 69.0 g (500 mmol) of potassium carbonate were added followed by stirring at 80 degrees C. for ten hours. To the thus-obtained reaction solution, 600 ml of deionized water and 600 ml of ethyl acetate (manufactured by Tokyo Chemical Industry Co., Ltd.) were added to isolate the organic layer. Thereafter, the thus-obtained organic layer was dried with anhydrous sodium sulfate (manufactured by TOKYO CHEMICAL INDUSTRY CO., LTD.) and the solvent was distilled away to obtain a residue. The residue was subject to silica gel column chromatography with a solvent mixture of ethylene acetate and hexane with a volume ratio of 30:70 as an eluent to obtain 30.4 g of reaction intermediate A-1.

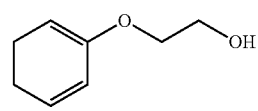

(A-1)

Next, 27.2 g (200 mmol) of the reaction intermediate A-1 and 37.4 g (260 mmol) of glycidyl methacrylate (manufactured by TOKYO CHEMICAL INDUSTRY CO., LTD.) were dissolved in 150 ml of N,N-dimethyl formamide (manufactured by TOKYO CHEMICAL INDUSTRY CO., LTD.) followed by stirring at 70 degrees C. for 20 hours. A total of 200 ml of water was repetitively added to this solution followed by extraction with 100 ml of ethyl acetate (manufactured by Tokyo Chemical Industry Co., Ltd.) three times. Further, the organic layer was rinsed and isolated with 100 ml of an aqueous solution of 10 percent potassium hydroxide (manufactured by TOKYO CHEMICAL INDUSTRY CO., LTD.). The isolated layer was dried with anhydrous sodium sulfate (manufactured by TOKYO CHEMICAL INDUSTRY CO., LTD.) followed by distilling the solvent away. The residue was subject to silica gel column chromatography with a solvent mixture of ethylene acetate and hexane with a volume ratio of 5:95 as an eluent. The solvent of the obtained solution was distilled away. The residue was dissolved in 30 ml of methylene chloride and the organic layer was rinsed with 20 ml of 10 percent aqueous potassium hydroxide solution and deionized water and the solvent was distilled away. The residue was dissolved in 10 ml of acetone (manufactured by TOKYO CHEMICAL INDUSTRY CO., LTD.) and recrystallized with 70 ml of hexane (manufactured by TOKYO CHEMICAL INDUSTRY CO., LTD.) to obtain 14.2 g of a monomer M-1.

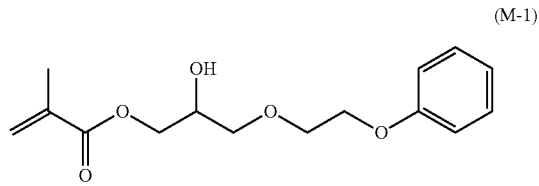 [SMILES: C=C(C)C(=O)OCC(O)COCCOc1ccccc1]

(M-1)

Next, 2.00 g (28 mmol) of acrylic acid (manufactured by TOKYO CHEMICAL INDUSTRY CO., LTD.), 10.1 g (36 mmol) of the monomer M-1, and 0.361 g (2.2 mmol) of 2,2'-azoiso(butylonitrile) (manufactured by TOKYO CHEMICAL INDUSTRY CO., LTD.) were dissolved in 100 mL of methyl ethyl ketone (manufactured by TOKYO CHEMICAL INDUSTRY CO., LTD.) to prepare a monomer solution. To a reaction container, 20 mL of methylethyl ketone (manufactured by TOKYO CHEMICAL INDUSTRY CO., LTD.) was added followed by heating to 75 degrees C. in argon atmosphere. Subsequently, the monomer solution was dripped to the reaction container in one hour followed by stirring for five hours during reflux. The resulting solution was cooled down to room temperature and the thus-obtained reaction solution was dropped to hexane. The precipitated copolymer was filtrated followed by drying with a reduced pressure to obtain 11.8 g of a copolymer CP-1 (weight average molecular weight (Mw): 29,200, number average molecular weight (Mn): 10,300).

Next, 10 g of the copolymer CP-1 was dissolved in an aqueous solution of diethanol amine (manufactured by TOKYO CHEMICAL INDUSTRY CO., LTD.) so as to have a pH of 8.0 to obtain an aqueous solution of copolymer CP-1 (copolymer solid content concentration of 10 percent by mass).

Synthesis Example 2: Synthesis of Copolymer CP-2

The following monomer M-2 was synthesized in the same manner as in Synthesis of Copolymer CP-1 except that phenol was replaced with 2-naphthol (manufactured by TOKYO CHEMICAL INDUSTRY CO., LTD.) to obtain an aqueous solution of copolymer CP-2 (weight average molecular weight: (Mw): 29500, number average molecular weight: 10,000).

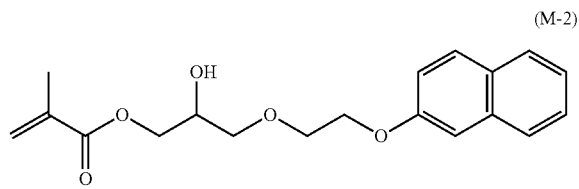 [SMILES: C=C(C)C(=O)OCC(O)COCCOc1ccc2ccccc2c1]

(M-2)

Synthesis Example 3: Synthesis of Copolymer CP-3

The following monomer M-3 was synthesized in the same manner as in Synthesis of Copolymer CP-1 except that phenol was replaced with 4-phenylphenol (manufactured by Tokyo Chemical Industry Co., Ltd.) to obtain an aqueous solution of copolymer CP-3 (weight average molecular weight (Mw): 32,000, number average molecular weight: 11,000).

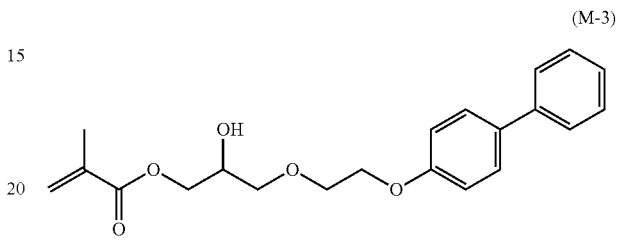

(M-3)

Synthesis Example 4: Synthesis of Copolymer CP-4

The following monomer M-4 was synthesized in the same manner as in Synthesis of Copolymer CP-1 except that 2-chloroethanol was replaced with 6-chloro-1-hexanol (manufactured by TOKYO CHEMICAL INDUSTRY CO., LTD.) to obtain an aqueous solution of copolymer CP-4 (weight average molecular weight: (Mw): 30,100, number average molecular weight: 13,500).

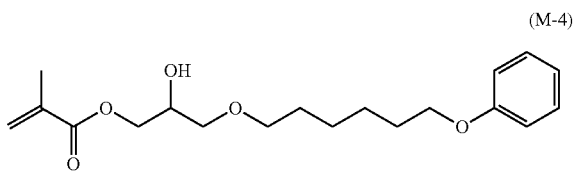 [SMILES: C=C(C)C(=O)OCC(O)COCCCCCCOc1ccccc1]

(M-4)

Synthesis Example 5: Synthesis of Copolymer CP-5

The following monomer M-5 was synthesized in the same manner as in the Synthesis of Copolymer CP-1 except that phenol was replaced with 2-naphthol and 2-chloroethanol was replaced with 6-chloro-1-hexanol (manufactured by TOKYO CHEMICAL INDUSTRY CO., LTD.) to obtain an aqueous solution of copolymer CP-5 (weight average molecular weight: (Mw): 29,900, number average molecular weight: 13,100).

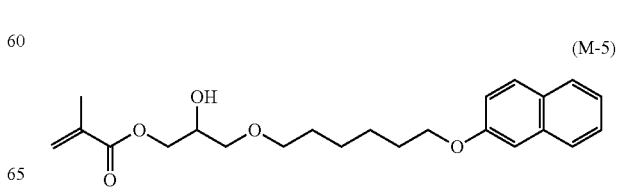

(M-5)

Synthesis Example 6: Synthesis of Copolymer CP-6

The following monomer M-6 was synthesized in the same manner as in Synthesis of Copolymer CP-1 except that 2-chloroethanol used in was replaced with 10-chloro-1-dwecanol (manufactured by Sigma-Aldrich Co. LLC.) to obtain an aqueous solution of polymer CP-6 (weight average molecular weight: (Mw): 28,800, number average molecular weight: 12,800).

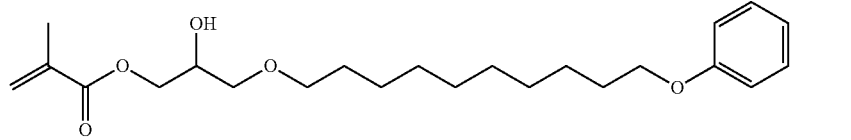

(M-6)

Synthesis Example 7: Synthesis of Copolymer CP-7

The following monomer M-7 was synthesized in the same manner as in Synthesis of Copolymer CP-1 except that phenol was replaced with 2-naphthol and 2-chloroethanol was replaced with 10-chloro-1-decanol (manufactured by Sigma-Aldrich Co. LLC.) to obtain an aqueous solution of copolymer CP-7 (weight average molecular weight: (Mw): 29,900, number average molecular weight: 12,200).

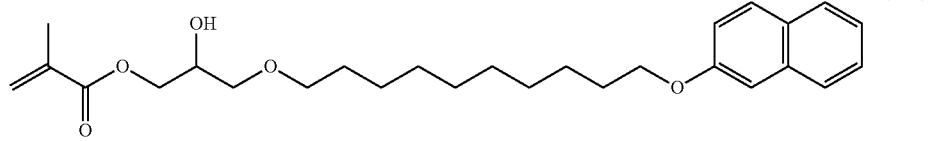

(M-7)

Synthesis Example 8: Synthesis of Copolymer CP-8

A liquid mixture of 21.5 g (250 mmol) of methacrylic acid (manufactured by TOKYO CHEMICAL INDUSTRY CO., LTD.), 160.0 g (1,727 mmol) of epichlorohydrin (manufactured by TOKYO CHEMICAL INDUSTRY CO., LTD.), 0.25 g (1 mmol) of triethyl benzylammonium chloride (manufactured by TOKYO CHEMICAL INDUSTRY CO., LTD.), and 0.05 g (0.4 mmol) of 4-methoxyphenol (manufactured by TOKYO CHEMICAL INDUSTRY CO., LTD.) were stirred at 100 degrees C. for three hours. While cooling down the liquid mixture with water, 63 g of 16 percent aqueous solution of sodium hydroxide (manufactured by TOKYO CHEMICAL INDUSTRY CO., LTD.) was added followed by stirring for one hour and allowing to stand for 30 minutes. The organic layer was isolated followed by fractional distillation to obtain 34.1 g of a reaction intermediate B-1.

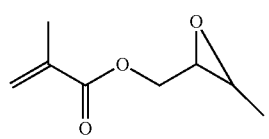

(B-1)

Next, the following monomer M-8 was synthesized in the same manner as in Synthesis of Copolymer CP-1 except that phenol was replaced with 2-naphthol and glycidyl methacrylate was replaced with the reaction intermediate B-1 to obtain an aqueous solution of copolymer CP-8 (weight average molecular weight: (Mw): 29,500, number average molecular weight: 13.100).

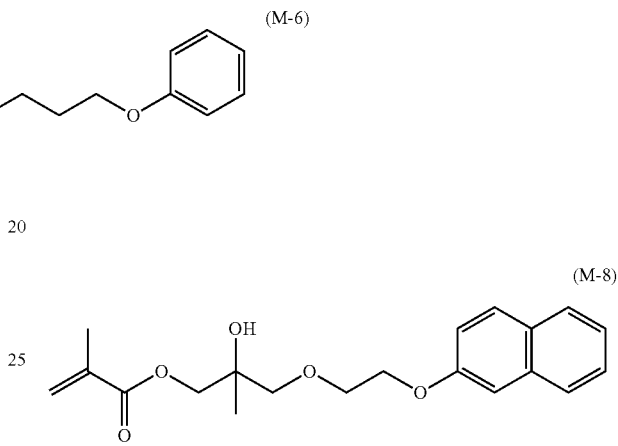

(M-8)

Synthesis Example 9: Synthesis of Copolymer CP-9

A liquid mixture of 21.5 g (250 mmol) of methacrylic acid (manufactured by TOKYO CHEMICAL INDUSTRY CO., LTD.), 160.0 g (1,327 mmol) of 2-(chloromethyl)-1,2-epoxybutane (manufactured by TOKYO CHEMICAL INDUSTRY CO., LTD.), 0.25 g (1 mmol) of triethyl benzylammonium chloride (manufactured by TOKYO CHEMICAL INDUSTRY CO., LTD.), and 0.05 g (0.4 mmol) of 4-methoxyphenol (manufactured by TOKYO CHEMICAL INDUSTRY CO., LTD.) were stirred at 100 degrees C. for three hours. While cooling down the liquid mixture with water, 63 g of 16 percent aqueous solution of sodium hydroxide (manufactured by TOKYO CHEMICAL INDUSTRY CO., LTD.) was added followed by stirring for one hour and allowing to stand for 30 minutes. The organic layer was isolated followed by fractional distillation to obtain 34.1 g of a reaction intermediate B-2.).

Next, the following monomer M-9 was synthesized in the same manner as in Synthesis of Copolymer CP-1 except that phenol was replaced with 2-naphthol and glycidyl methacrylate was replaced with the reaction intermediate B-2 to obtain an aqueous solution of copolymer CP-9 (weight average molecular weight: (Mw): 31,000, number average molecular weight: 12,500).

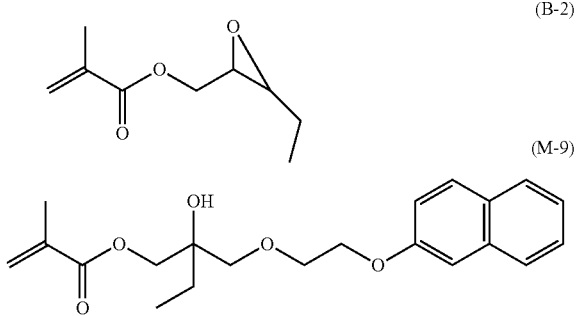

(B-2)

(M-9)

Synthesis Example 10: Synthesis of Copolymer CP-10

The following monomer M-10 was synthesized in the same manner as in Synthesis of Copolymer CP-1 except that phenol was replaced with 2-naphthol, 2-chloroethanol was replaced with 10-chloro-1-decanol, and benzyl methacrylate was replaced with the reaction intermediate B-1 to obtain an aqueous solution of copolymer CP-10 (weight average molecular weight: (Mw): 30,100, number average molecular weight: 11,100).

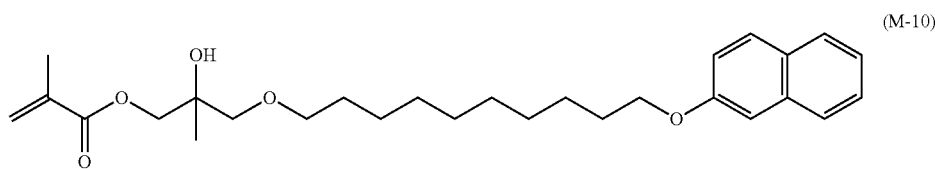 [SMILES: C=C(C)C(=O)OCC(C)(O)COCCCCCCCCCCOc1ccc2ccccc2c1]

(M-10)

Synthesis Example 11: Synthesis of Copolymer CP-11

The following monomer M-11 was synthesized in the same manner as in Synthesis of Copolymer CP-1 except that phenol was replaced with 2-naphthol, 2-chloroethanol was replaced with 10-chloro-1-decanol, and benzyl methacrylate was replaced with the reaction intermediate B-2 to obtain an aqueous solution of copolymer CP-11 (weight average molecular weight: (Mw): 30,500, number average molecular weight: 13,700).

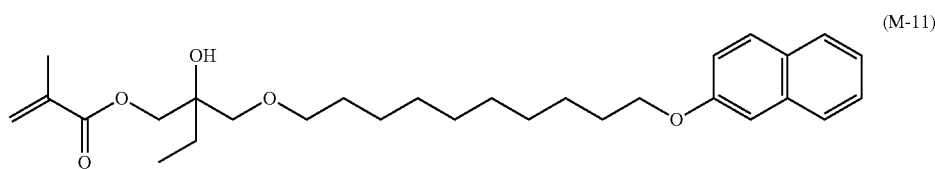 [SMILES: C=C(C)C(=O)OCC(O)(CC)COCCCCCCCCCCOc1ccc2ccccc2c1]

(M-11)

Preparation Example 1 of Pigment Dispersion

Preparation of Pigment Dispersion PD-1

Deionized water was added to 60.0 parts of the aqueous solution of the copolymer CP-1 of Synthesis Example 1 to make the total amount of the aqueous solution 80.0 parts. 20.0 parts of carbon black (NIPEX150, manufactured by Degussa AG) was added to 80.0 parts of the thus-obtained aqueous solution followed by stirring for 12 hours. The thus-obtained mixture was subjected to circulation dispersion using a disk type bead mill (KDL type, media: zirconia ball having a diameter of 0.1 mm, manufactured by Shinmaru Enterprises Corporation) at a peripheral speed of 10 m/s for one hour followed by filtration by a membrane filter having an average pore diameter of 1.2 micro meter. Thereafter, deionized water was added for balance to obtain 98.0 parts of Pigment Dispersion PD-1 (solid pigment portion concentration of 20 percent by mass).

Preparation Examples 2 to 12 of Pigment Dispersion

Preparation of Pigment Dispersion PD-2 to PD-12

Pigment Dispersions PD-2 to PD-14 were prepared in the same manner as in Preparation Example 1 of Pigment Dispersion except that Copolymers CP-2 to CP-11 were used in an amount (parts) shown in Table 1 and the pigments shown in Table 1 were used.

TABLE 1

| Dispersion | Aqueous solution of copolymer Type | Aqueous solution of copolymer parts by mass | Deionized water parts by mass | Carbon black parts by mass | Pigment Red 122 parts by mass | Pigment Blue 15:3 parts by mass | Pigment yellow 74 parts by mass |
|---|---|---|---|---|---|---|---|
| PD-1 | CP-1 | 60.0 | 20.0 | 20.0 | | | |
| PD-2 | CP-2 | 60.0 | 20.0 | 20.0 | | | |
| PD-3 | CP-3 | 60.0 | 20.0 | 20.0 | | | |
| PD-4 | CP-4 | 60.0 | 20.0 | 20.0 | | | |
| PD-5 | CP-5 | 60.0 | 20.0 | 20.0 | | | |
| PD-6 | CP-6 | 60.0 | 20.0 | 20.0 | | | |
| PD-7 | CP-7 | 60.0 | 20.0 | 20.0 | | | |
| PD-8 | CP-8 | 60.0 | 20.0 | 20.0 | | | |
| PD-9 | CP-9 | 60.0 | 20.0 | 20.0 | | | |
| PD-10 | CP-10 | 60.0 | 20.0 | 20.0 | | | |
| PD-11 | CP-11 | 60.0 | 20.0 | 20.0 | | | |
| PD-12 | CP-2 | 60.0 | 20.0 | | 20.0 | | |
| PD-13 | CP-2 | 60.0 | 20.0 | | | 20.0 | |
| PD-14 | CP-2 | 60.0 | 20.0 | | | | 20.0 |

The pigments shown in Table 1 were the products below.
Carbon Black (NIPEX 150, manufactured by Degussa AG)
Pigment Red 122 (Toner magenta E02, manufactured by Clariant (Japan) K.K.)
Pigment Blue 15:3 (CHROMOFINE BLUE A-220JC, manufactured by Dainichiseika Color & Chemicals Mfg. Co., Ltd.)
Pigment Yellow 74 (Fast Yellow 531, manufactured by Dainichiseika Color & Chemicals Mfg. Co., Ltd.)

Example 1

Preparation of Ink GJ-1
A total of 40.0 parts of Pigment dispersion PD-1, 10.0 parts of glycerin, 10.0 parts of 1,3-butane diol, 10.0 parts of 3-methoxy-N,N-dimethyl propionamide, 1.0 part of 3-ethyl-3-hydroxymethyloxetane, 5.0 parts of ethylene glycol monobutyl ether, 1.0 part of 2-ethyl-1,3-hexane diol, 1.0 part of UNIDYNE™ DSN-403N (manufactured by DAIKIN INDUSTRIES, LTD.), and 18.0 parts of deionized water were mixed and stirred for one hour. Thereafter, the mixture was filtrated with a membrane filter having an average pore diameter of 1.2 μm to prepare Ink GJ-1 of Example 1.

Examples 2 to 14

Preparation of Ink GJ-2 to GJ-14
Ink GJ-2 to Ink GJ-14 of Examples 2 to 14 were prepared in the same manner as in Example 1 except that the ink formulations were changed as shown in Table 2.

TABLE 2

| Example | Ink | Pigment dispersion | parts by mass | Glycerin | 1,3-butanediol | 3-methoxy-N,N-dimethyl propione amide | 3-Ethyl-3hydroxy methyl oxetane |
|---|---|---|---|---|---|---|---|
| Example 1 | GJ-1 | PD-1 | 40.0 | 10.0 | 10.0 | 10.0 | 5.0 |
| Example 2 | GJ-2 | PD-2 | 40.0 | 10.0 | 10.0 | 10.0 | 5.0 |
| Example 3 | GJ-3 | PD-3 | 40.0 | 10.0 | 10.0 | 10.0 | 5.0 |
| Example 4 | GJ-4 | PD-4 | 40.0 | 10.0 | 5.0 | 10.0 | 10.0 |
| Example 5 | GJ-5 | PD-5 | 40.0 | 10.0 | 5.0 | 10.0 | 10.0 |
| Example 6 | GJ-6 | PD-6 | 40.0 | 10.0 | 5.0 | 10.0 | 10.0 |
| Example 7 | GJ-7 | PD-7 | 40.0 | 10.0 | 5.0 | 10.0 | 10.0 |
| Example 8 | GJ-8 | PD-8 | 40.0 | 10.0 | 10.0 | 5.0 | 10.0 |
| Example 9 | GJ-9 | PD-9 | 40.0 | 10.0 | 10.0 | 5.0 | 10.0 |
| Example 10 | GJ-10 | PD-10 | 40.0 | 10.0 | 10.0 | 5.0 | 10.0 |
| Example 11 | GJ-11 | PD-11 | 40.0 | 10.0 | 10.0 | 5.0 | 10.0 |

TABLE 2-continued

| Example | Ink | | | | | |
|---|---|---|---|---|---|---|
| Example 12 | GJ-12 | PD-12 | 40.0 | 10.0 | 10.0 | 10.0 | 5.0 |
| Example 13 | GJ-13 | PD-13 | 40.0 | 10.0 | 10.0 | 10.0 | 5.0 |
| Example 14 | GJ-14 | PD-14 | 40.0 | 10.0 | 10.0 | 10.0 | 5.0 |

| Example | Ink | Water-soluble organic solvent | | | | Surfactant Unidyne DSN-403N | Deionized water |
|---|---|---|---|---|---|---|---|
| | | Ethylene glycol monobutyl ether | 2-pyrrolidone | 2-Ethyl-1,3-hexane diol | 2,2,4-Trimethyl-1.3-pentane diol | | |
| Example 1 | GJ-1 | 5.0 | | 1.0 | | 1.0 | 18.0 |
| Example 2 | GJ-2 | 5.0 | | 1.0 | | 1.0 | 18.0 |
| Example 3 | GJ-3 | 5.0 | | 1.0 | | 1.0 | 18.0 |
| Example 4 | GJ-4 | 5.0 | 1.0 | | 1.0 | | 18.0 |
| Example 5 | GJ-5 | 5.0 | 1.0 | | 1.0 | | 18.0 |
| Example 6 | GJ-6 | 5.0 | 1.0 | | 1.0 | | 18.0 |
| Example 7 | GJ-7 | 5.0 | 1.0 | | 1.0 | | 18.0 |
| Example 8 | GJ-8 | 5.0 | | 1.0 | | 1.0 | 18.0 |
| Example 9 | GJ-9 | 5.0 | | 1.0 | | 1.0 | 18.0 |
| Example 10 | GJ-10 | 5.0 | | 1.0 | | 1.0 | 18.0 |
| Example 11 | GJ-11 | 5.0 | | 1.0 | | 1.0 | 18.0 |
| Example 12 | GJ-12 | 5.0 | | 1.0 | | 1.0 | 18.0 |
| Example 13 | GJ-13 | 5.0 | | 1.0 | | 1.0 | 18.0 |
| Example 14 | GJ-14 | 5.0 | | 1.0 | | 1.0 | 18.0 |

Comparative Example 1

Synthesis of Copolymer RCP-1

A total of 4.0 g (56 mmol) of acrylic acid (manufactured by TOKYO CHEMICAL INDUSTRY CO., LTD.), 12.6 g (72 mmol) of benzyl methacrylate (manufactured by TOKYO CHEMICAL INDUSTRY CO., LTD.), and 0.72 g (4.4 mmol) of 2,2'-azoiso (butyronitrile) (manufactured by TOKYO CHEMICAL INDUSTRY CO., LTD.) were dissolved in 200 mL of methyl ethyl ketone (manufactured by TOKYO CHEMICAL INDUSTRY CO., LTD.) to prepare a monomer solution. To a reaction container, 40 mL of methylethyl ketone (manufactured by TOKYO CHEMICAL INDUSTRY CO., LTD.) was added followed by heating to 75 degrees C. in argon atmosphere. Subsequently, the monomer solution was dripped to the reaction container in one hour followed by stirring for five hours during reflux. The resulting solution was cooled down to room temperature and the thus-obtained reaction solution was dropped to hexane. The precipitated copolymer was filtrated followed by drying with a reduced pressure to obtain 16.0 g of a copolymer RCP-1 (weight average molecular weight (Mw): 29,200, number average molecular weight (Mn): 10,900).

Next, 10 g of the copolymer RCP-1 was dissolved in an aqueous solution of diethanolamine (manufactured by Tokyo Chemical Industry Co., Ltd.) so as to have a pH of 8.0 to obtain an aqueous solution of copolymer RCP-1 (copolymer solid content concentration of 10 percent by mass).

Preparation of Pigment Dispersion RPD-1

Deionized water was added to 60.0 g of Copolymer RCP-1 aqueous solution of Comparative Example 1 to make the total amount of the aqueous solution 80.0 parts. 20.0 parts of carbon black (NIPEX150, manufactured by Degussa AG) was added to 80.0 parts of the thus-obtained aqueous solution followed by stirring for 12 hours. The thus-obtained mixture was subjected to circulation dispersion using a disk type bead mill (KDL type, media: zirconia ball having a diameter of 0.1 mm, manufactured by Shinmaru Enterprises Corporation) at a peripheral speed of 10 m/s for one hour followed by filtration by a membrane filter having an average pore diameter of 1.2 micro meter. Thereafter, deionized water was added for balance to obtain 98.2 parts of Pigment dispersion RPD-1 (solid pigment portion concentration of 20 percent by mass).

Preparation of Ink RGJ-1

Thereafter, ink RGJ-1 was obtained in the same manner as in Example 1 except that the pigment dispersion RPD-1 was used instead of the pigment dispersion PD-1 in the ink preparation of Example 1.

Comparative Example 2

Synthesis of Copolymer RCP-2

A total of 48.8 g (787 mmol) of ethylene glycol (manufactured by TOKYO CHEMICAL INDUSTRY CO., LTD.) was dissolved in 200 mL of methylene chloride (dichloromethane) and thereafter 21.8 g (275 mmol) of pyridine was further added. To this solution, a solution in which 50.0 g (262 mmol) of 2-naphthalene carbonyl chloride (manufacture by Tokyo Chemical Industry Co. Ltd.) was dissolved in 100 ml of methylene chloride was dripped in 30 minutes during stirring followed by stirring at room temperature for six hours. The thus-obtained reaction solution was rinsed with water and thereafter the organic phase was isolated followed by drying with magnesium sulfate to distill the solvent away. The residue was refined by silica gel column chromatography with a solvent mixture of methylene chloride and methanol in a volume ratio of 99:1 as an eluent to obtain 72.6 g of Compound RA-1.

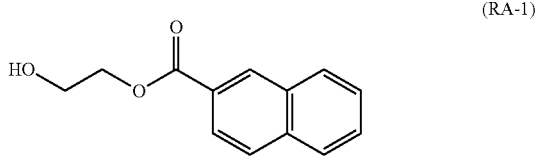 [SMILES: O=C(OCCO)c1ccc2ccccc2c1]

(RA-1)

A total of 32.4 g (150 mmol) of Compound RA-1 was dissolved in 80 mL of super-dehydrated dichloromethane (manufactured by Wako Pure Chemical Industries, Ltd.). To this solution, 21.2 g (150 mmol) of 2-methacryloyloxyethyl isocyanate (Karen MOI, manufactured by SHOWA DENKO K.K.) was dripped in one hour during stirring followed by stirring at 40 degrees C. for 12 hours. After distilling away the solvent, the residue was refined by silica gel column chromatography with a solvent mixture of methylene chloride and methanol with a volume ratio of 99:1 as an eluent to obtain 46.1 g of Monomer RM-1 as the target product.

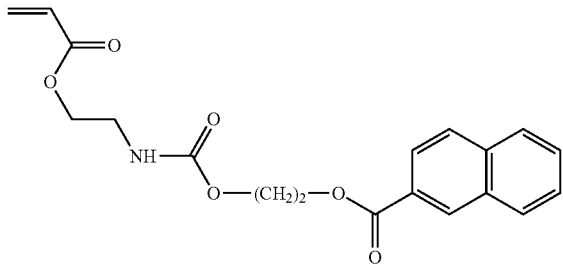

(RM-1)

Next, 3.80 g (44.1 mmol) of acrylic acid (manufactured by Sigma-Aldrich Co. LLC.), 16.01 g (43.1 mmol) of Monomer RM-1, and 0.721 g (4.39 mmol) of 2,2'-azoiso(butylonitrile) (manufactured by TOKYO CHEMICAL INDUSTRY CO., LTD.) were dissolved in 128 mL of methyl ethyl ketone (manufactured by Kanto Chemical Co., Inc.) to prepare a monomer solution. To a reaction container, 32 mL of methyl ethyl ketone (manufactured by Kanto Chemical Co., Inc.) was added followed by heating to 75 degrees C. in argon atmosphere. Subsequently, the monomer solution was dripped to the reaction container in one hour followed by stirring for five hours during reflux. The resulting solution was cooled down to room temperature and the thus-obtained reaction solution was dropped to hexane. The precipitated copolymer was filtrated followed by drying with a reduced pressure to obtain 19.57 g of a copolymer RCP-2 (weight average molecular weight (Mw) of 20,200, number average molecular weight (Mn) of 8,900).

Preparation of Pigment Dispersion RPD-2

A total of 6.0 parts of Copolymer RCP-2 was dissolved in 50.0 parts of diethanol amine aqueous solution in such a manner that pH was 8.0. Moreover, deionized water was added to make the total amount of the aqueous solution. A total of 80.0 parts. 20.0 parts of carbon black (NIPEX150, manufactured by Degussa AG) was added to 80.0 parts of the thus-obtained aqueous solution followed by stirring for 12 hours.

The thus-obtained mixture was subjected to circulation dispersion using a disk type bead mill (KDL type, media: zirconia ball having a diameter of 0.1 mm, manufactured by Shinmaru Enterprises Corporation) at a peripheral speed of 10 m/s for one hour followed by filtration by a membrane filter having an average pore diameter of 1.2 micro meter. Thereafter, deionized water was added for balance to obtain 97.0 parts of pigment dispersion RPD-2 (solid pigment portion concentration of 20 percent by mass).

Preparation of Ink RGJ-2

Thereafter, ink RGJ-2 was obtained in the same manner as in Example 1 except that the pigment dispersion RPD-2 was used instead of the pigment dispersion PD-1 in the ink preparation of Example 1.

Comparative Example 3

Preparation of Pigment Dispersion RPD-3

A total of 6.0 parts of copolymer RCP-2 was dissolved in 50.0 parts of diethanol amine aqueous solution in such a manner that pH was 8.0. Moreover, deionized water was added to make the total amount of the aqueous solution 84.0 parts. A total of 20.0 parts of Pigment Red 122 (TONER MAGENTA E02, manufactured by Clariant (Japan) KK) was added to 84.0 parts of the thus-obtained aqueous solution followed by stirring for 12 hours.

The thus-obtained mixture was subjected to circulation dispersion using a disk type bead mill (KDL type, media: zirconia ball having a diameter of 0.1 mm, manufactured by Shinmaru Enterprises Corporation) at a peripheral speed of 10 m/s for one hour followed by filtration by a membrane filter having an average pore diameter of 1.2 micro meter. Thereafter, deionized water was added for balance to obtain 97.0 parts of pigment dispersion RPD-3 (solid pigment portion concentration of 20 percent by mass).

Preparation of Ink RGJ-3 Next, ink RGJ-3 was obtained in the same manner as in Example 1 except that the comparative pigment dispersion RPD-3 was used instead of the pigment dispersion PD-12 in the ink preparation of Example 12.

Comparative Example 4

Preparation of Pigment Dispersion RPD-4

A total of 6.0 parts of copolymer RCP-2 was dissolved in 50.0 parts of diethanol amine aqueous solution in such a manner that pH was 8.0. Moreover, deionized water was added to make the total amount of the aqueous solution 80.0 parts. A total of 20.0 parts of Pigment Blue 15:3 (CHROMOFINE BLUE A-220JC, manufactured by Dainichiseika Color & Chemicals Mfg. Co., Ltd.) was added to 80.0 parts of the thus-obtained aqueous solution followed by stirring for 12 hours.

The thus-obtained mixture was subjected to circulation dispersion using a disk type bead mill (KDL type, media: zirconia ball having a diameter of 0.1 mm, manufactured by Shinmaru Enterprises Corporation) at a peripheral speed of 10 m/s for one hour followed by filtration by a membrane filter having an average pore diameter of 1.2 micro meter. Thereafter, deionized water was added for balance to obtain 97.0 parts of pigment dispersion RPD-4 (solid pigment portion concentration of 20 percent by mass).

Preparation of Ink RGJ-4

Thereafter, ink RGJ-4 was obtained in the same manner as in Example 1 except that the pigment dispersion RPD-4 was used instead of the pigment dispersion PD-13 in the ink preparation of Example 13.

Comparative Example 5

Preparation of Pigment Dispersion RPD-5

6.0 parts of copolymer RCP-2 was dissolved in 50.0 parts of diethanol amine aqueous solution in such a manner that pH was 8.0. Moreover, deionized water was added to make the total amount of the aqueous solution 80.0 parts. 20.0 parts of Pigment Yellow 74 (FAST YELLOW 531, manufactured by Dainichiseika Color & Chemicals Mfg. Co., Ltd.) was added to 80.0 parts of the thus-obtained aqueous solution followed by stirring for 12 hours.

The thus-obtained mixture was subjected to circulation dispersion using a disk type bead mill (KDL type, media: zirconia ball having a diameter of 0.1 mm, manufactured by Shinmaru Enterprises Corporation) at a peripheral speed of 10 m/s for one hour followed by filtration by a membrane filter having an average pore diameter of 1.2 micro meter. Thereafter, deionized water was added for balance to obtain 97.0 parts of pigment dispersion RPD-5 (solid pigment portion concentration of 20 percent by mass).

Preparation of Ink RGJ-5

Thereafter, ink RGJ-5 was obtained in the same manner as in Example 1 except that the pigment dispersion RPD-5 was used instead of the pigment dispersion PD-14 in the ink preparation of Example 14.

Properties of the ink prepared in Examples 1 to 14 and Comparative Examples 1 to 5 were evaluated in the following manner. The results are shown in Table 3.

Storage Stability of Ink

An ink accommodating container was filled with each ink and stored at 70 degrees C. for one week. The change ratio was obtained from the following relationship and evaluated according to the following criteria. Viscosity was measured by a viscometer (RE80L, manufactured by TOM SANGYO CO., LTD.) to measure the viscosity of the ink at 25 degrees C. at 50 rotations.

Relationship 1

Change ratio (percent) of viscosity={(ink viscosity after storage−ink viscosity of before storage)/ink viscosity before storage}×100

Evaluation Criteria

A: Change ratio of viscosity within the range of from −5% to +5%

B: Change ratio of viscosity within the range of from −8% to less than −5% and more than 5% to 8%

C: Change ratio of viscosity within the range of from −10% to less than −8% and more than 8% to 10%

D: Change ratio of viscosity within the range of from less than −10% to −30% and more than 10% to 30%

E: Change ratio of viscosity less than −30% or greater than 30% (including, gelated to the degree that evaluation was not possible)

Discharging Recovery

An inkjet printer (IPSiO GX5000, manufactured by Ricoh Co., Ltd.) was filled with each of the inks of Examples and Comparative Examples and left for three hours in an HL environment (32±0.5 degrees C., 15±5 percent RH). A nozzle check pattern was printed and it was checked that there were no discharging failures such as dot omission or discharging deviation in the air. Further, it was allowed to rest as was (decapped state) for six days. After resting, a single nozzle check pattern with a solid printing portion was printed on high-quality paper My Paper (manufactured by Ricoh Co., Ltd.) with a basis weight of 69.6 g/m$^2$, a size degree of 23.2 seconds, and air permeability of 21.0 seconds to check whether there was dot omission and discharging deviation in the air. If the dot omission or discharging deviation was present in the nozzle check pattern, the printer nozzle was cleaned back to normal printing as restoring operation. The total number of cleaning was counted and evaluated. Based on the obtained total number of cleaning, the discharging recovery of each ink was evaluated according to the following evaluation criteria. The ink was determined as practically usable when graded C or above.

Evaluation Criteria

A: No cleaning
B: Cleaning once
C: Cleaning twice
D: Cleaning three to less than five times
E: Cleaning five times or more

TABLE 3

| | | Chemical formula 1 | | | | | |
| --- | --- | --- | --- | --- | --- | --- | --- |
| | | $L_1$ | | | | | |
| | Type of pigment | Number of carbon atoms | Hydroxyl group | $L_2$ (number of carbon atoms) | Ar | Storage stability of ink | Discharging Recovery |
| Example 1 | Black | 3 | Yes | 2 | Phenyl group | B | A |
| Example 2 | Black | 3 | Yes | 2 | Naphthyl group | A | A |
| Example 3 | Black | 3 | Yes | 2 | Biphenyl group | B | A |
| Example 4 | Black | 3 | Yes | 6 | Phenyl group | B | A |
| Example 5 | Black | 3 | Yes | 6 | Naphthyl group | A | A |
| Example 6 | Black | 3 | Yes | 10 | Phenyl group | B | A |
| Example 7 | Black | 3 | Yes | 10 | Naphthyl group | A | A |

TABLE 3-continued

| | | | | | | | |
|---|---|---|---|---|---|---|---|
| Example 8 | Black | 4 | Yes | 2 | Naphthyl group | A | A |
| Example 9 | Black | 5 | Yes | 2 | Naphthyl group | A | A |
| Example 10 | Black | 4 | Yes | 10 | Naphthyl group | A | A |
| Example 11 | Black | 5 | Yes | 10 | Naphthyl group | A | A |
| Example 12 | Magenta | 3 | Yes | 2 | Naphthyl group | A | A |
| Example 13 | Cyan | 3 | Yes | 2 | Naphthyl group | A | A |
| Example 14 | Yellow | 3 | Yes | 2 | Naphthyl group | A | A |
| Comparative Example 1 | Black | 1 | None | None | Phenyl group | E | E |
| Comparative Example 2 | Black | 2 | None | 2 | Naphthyl group | A | C |
| Comparative Example 3 | Magenta | 2 | None | 2 | Naphthyl group | A | C |
| Comparative Example 4 | Cyan | 2 | None | 2 | Naphthyl group | A | C |
| Comparative Example 5 | Yellow | 2 | None | 2 | Naphthyl group | A | C |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An ink comprising:
water;
a coloring material; and
a polymer having a structure unit represented by the following Chemical formula 1 and a structure unit having an anionic group,

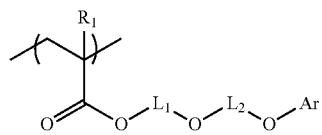

Chemical formula 1 where $R_1$ represents a hydrogen atom or a methyl group, $L_1$ is an alkylene group having three to five carbon atoms having a hydroxyl group, $L_2$ is an alkylene group having two to ten carbon atoms, and Ar represents a phenyl group, a biphenyl group, or a naphthyl group.

2. The ink according to claim 1, wherein Ar is a naphthyl group.

3. The ink according to claim 1, wherein the structure unit having an anionic group is represented by the following Chemical formula 2,

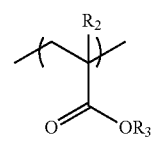

Chemical formula 2 where $R_2$ represents a hydrogen atom or a methyl group and $R_3$ represents a hydrogen atom or a cation.

4. The ink according to claim 1, where the polymer has a weight average molecular weight of from 10,000 to 50,000.

5. The ink according to claim 1, wherein the coloring material comprises a pigment.

6. An ink accommodating container comprising:
the ink of claim 1; and
a container containing the ink.

7. A recording device comprising:
the ink accommodating container of claim 6 and
an ink applying device configured to apply the ink.

8. A recording method comprising:
applying the ink of claim 1 to a recording medium.

9. Recorded matter comprising:
a recording medium; and
a printing layer formed on the recording medium,
wherein the printing layer contains a coloring material and a polymer having a structure unit represented by the following Chemical formula 1 and a structure unit having an anionic group,

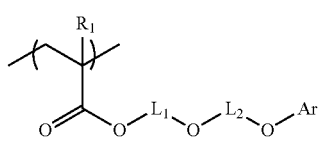

Chemical formula 1 where $R_1$ represents a hydrogen atom or a methyl group, $L_1$ is an alkylene group having three to five carbon atoms having a hydroxyl group, $L_2$ is an alkylene group having two to ten carbon atoms, and Ar represents a phenyl group, a biphenyl group, or a naphthyl group.

* * * * *